United States Patent
Woo et al.

(10) Patent No.: US 11,347,393 B2
(45) Date of Patent: May 31, 2022

(54) ELECTRONIC DEVICE FOR PROCESSING WHEEL INPUT AND OPERATION METHOD THEREOF

(71) Applicant: Samsung Electronics Co., Ltd., Suwon-si (KR)

(72) Inventors: Seungwan Woo, Suwon-si (KR); Chulheon Jeong, Suwon-si (KR); Hyuksoon Choi, Suwon-si (KR); Hyunseok Yang, Suwon-si (KR); Seunghoon Ko, Suwon-si (KR); Sangheon Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/944,656

(22) Filed: Jul. 31, 2020

(65) Prior Publication Data

US 2021/0034234 A1 Feb. 4, 2021

(30) Foreign Application Priority Data

Aug. 2, 2019 (KR) .......................... 10-2019-0094427

(51) Int. Cl.
*G06F 3/04886* (2022.01)
*G06F 3/041* (2006.01)
*G06F 3/04845* (2022.01)

(52) U.S. Cl.
CPC .......... *G06F 3/04886* (2013.01); *G06F 3/041* (2013.01); *G06F 3/0418* (2013.01); *G06F 3/04845* (2013.01); *G06F 2203/04108* (2013.01)

(58) Field of Classification Search
CPC .......... G06F 2203/04108; G06F 3/041; G06F 3/0418; G06F 3/04845; G06F 3/04886
See application file for complete search history.

(56) References Cited

U.S. PATENT DOCUMENTS 10,019,108 B2 * 7/2018 Heo ..................... G06F 3/04186
10,671,222 B2 * 6/2020 Kuboyama ............. G06F 1/169
(Continued)

FOREIGN PATENT DOCUMENTS

KR  10-2010-0121183 A  11/2010
KR  10-2016-0104494 A   9/2016
(Continued)

OTHER PUBLICATIONS

Misfit Vapor Full Review: https://youtu.be/SNfYuZETvaY?t=9m35s (viewed Dec. 23, 2017).
(Continued)

*Primary Examiner* — Chun-Nan Lin
(74) *Attorney, Agent, or Firm* — Jefferson IP Law, LLP

(57) ABSTRACT

An electronic device for processing an input and a method therefor are provided. The electronic device includes a cover window, a display disposed under the cover window, a touch panel including one or more touch sensing elements disposed in a region corresponding to the display, the touch panel configured to generate at least one of a touch signal or a proximity signal by using the one or more touch sensing elements, at least one processor operationally connected to the display and the touch panel, and a memory operationally connected to the at least one processor. The memory may store instructions which, when executed by the at least one processor, cause the at least one processor to, identify a first touch input in a first region on the cover window, corresponding to the display, by using the touch signal generated by the touch sensor, identify a first proximity input in a second region on the cover window, surrounding the display, by using the proximity signal generated by the touch sensor, determine whether a designated input determination condition is satisfied, based on the first touch input and the first proximity input, select one of the touch input in the first
(Continued)

region corresponding to the display or the first proximity input in the second region surrounding the display, based on whether the designated input determination condition has been satisfied, and perform a function corresponding to the selected input.

21 Claims, 23 Drawing Sheets

(56) References Cited

U.S. PATENT DOCUMENTS

| | | | | |
|---|---|---|---|---|
| 2016/0259416 | A1* | 9/2016 | Birnbaum | G04G 21/08 |
| 2017/0038859 | A1* | 2/2017 | Park | G06F 1/1692 |
| 2017/0269765 | A1* | 9/2017 | Yoon | G06F 3/017 |
| 2018/0150152 | A1 | 5/2018 | Westerman | |
| 2018/0343023 | A1* | 11/2018 | Park | G06F 3/0346 |
| 2018/0364865 | A1 | 12/2018 | Li et al. | |
| 2019/0073961 | A1 | 3/2019 | Park et al. | |
| 2019/0080572 | A1* | 3/2019 | Kim | G06Q 30/02 |
| 2019/0131691 | A1 | 5/2019 | Hong et al. | |
| 2019/0391391 | A1* | 12/2019 | Pazmino | G06F 1/163 |

FOREIGN PATENT DOCUMENTS

| | | |
|---|---|---|
| KR | 10-2017-0016554 A | 2/2017 |
| KR | 10-2017-0024445 A | 3/2017 |
| KR | 10-2019-0027234 A | 3/2019 |
| KR | 10-2019-0049300 A | 5/2019 |

OTHER PUBLICATIONS

International Search Report and written opinion dated Nov. 25, 2020, issued in international Application No. PCT/KR2020/010101.

* cited by examiner

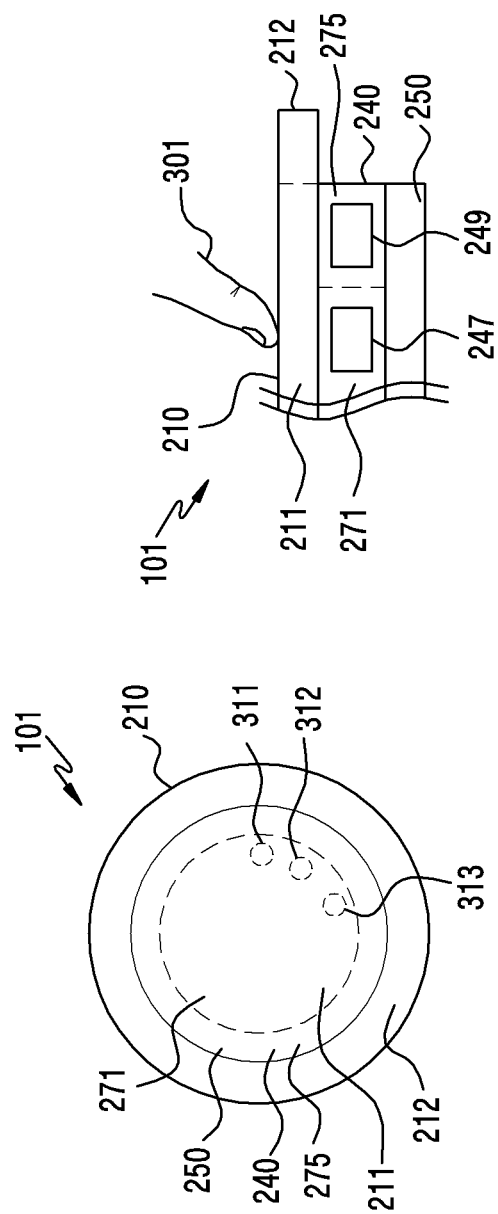

|  |  | T1 | T2 | T3 | T4 | T5 |
|---|---|---|---|---|---|---|
| Display Area | Touch Status | Touch Down | Touch Move | Touch Move | - | Touch Up |
| | Detect Status | Initial Detecting | Detecting | Detecting | Not Detecting | Not Detecting |
| Bezel Area | Touch Status | - | - | - | - | - |
| | Detect Status | Not Detecting | Not Detecting | Not Detecting | Not Detecting | Not Detecting |

FIG.4

|  |  | T1 | T2 | T3 | T4 | T5 |
|---|---|---|---|---|---|---|
| Display Area | Touch Status | - | - | - | - | - |
|  | Detect Status | Not Detecting | Not Detecting | Not Detecting | Not Detecting | Not Detecting |
| Bezel Area | Touch Status | Initial | Wheel | Wheel | - | - |
|  | Detect Status | Initial Detecting | Detecting | Detecting | Not Detecting | Not Detecting |

FIG.6

|  |  | T1 | T2 | T3 | T4 | T5 |
|---|---|---|---|---|---|---|
| Display Area | Touch Status | Touch Down | Touch Move | - | Touch Cancel | - |
|  | Detect Status | Initial Detecting | Detecting | Not Detecting | Not Detecting | Not Detecting |
| Bezel Area | Touch Status | - | Initial | Wheel | Wheel | Wheel |
|  | Detect Status | Not Detecting | Initial Detecting | Detecting | Detecting | Detecting |

FIG.8

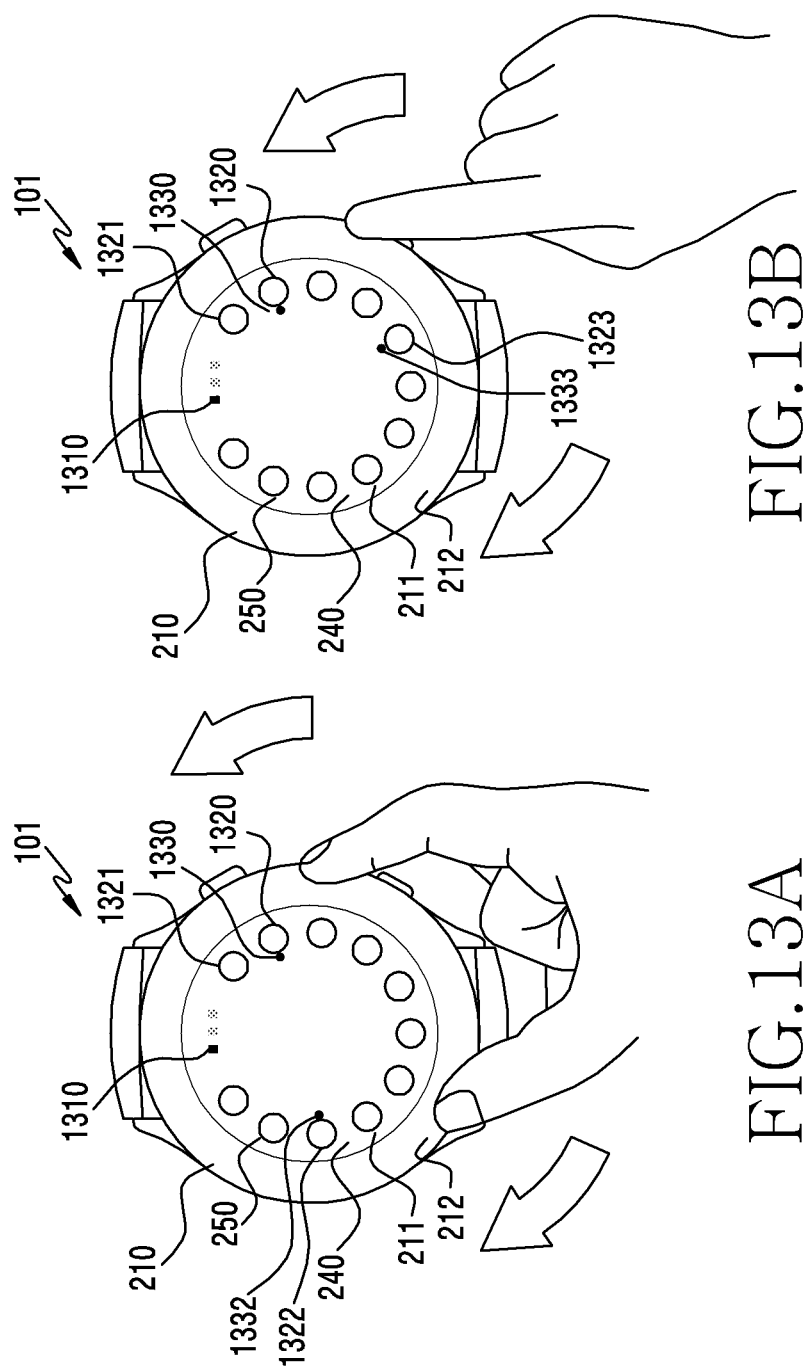

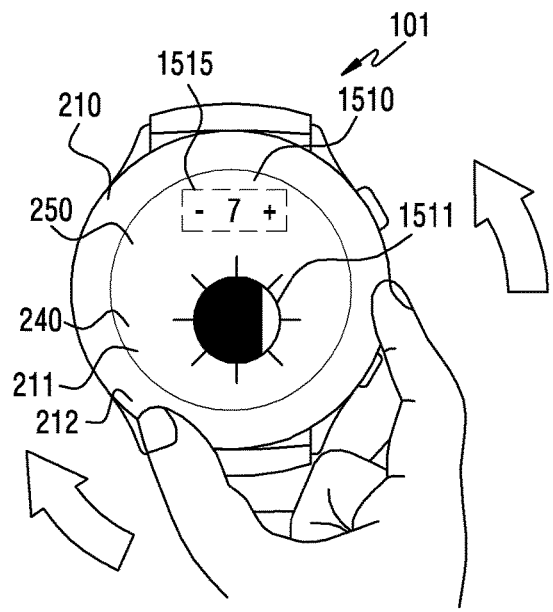
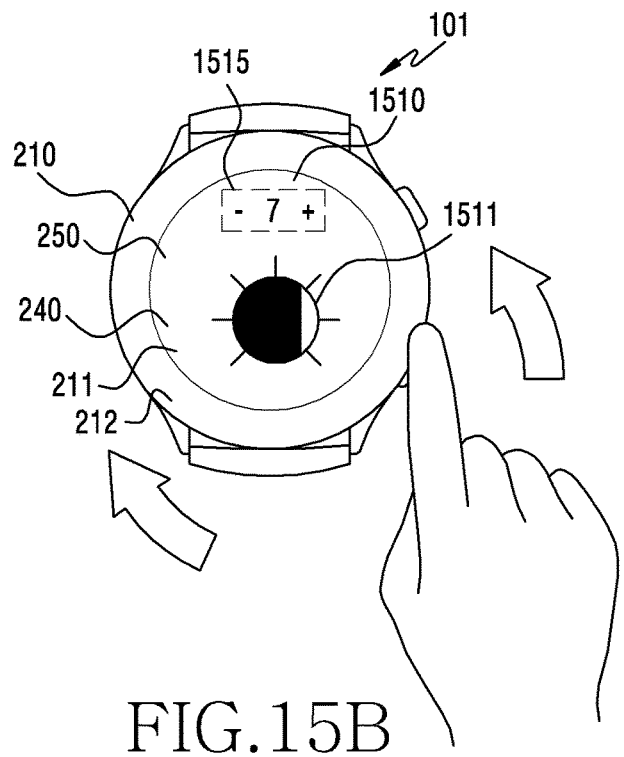
FIG.15A  FIG.15B
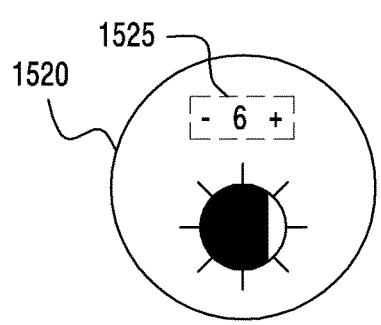
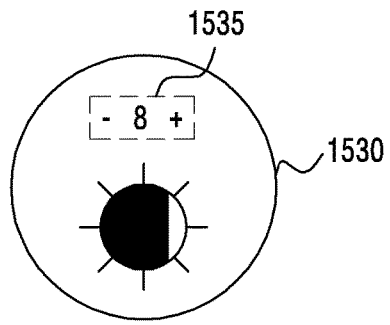
FIG.15C

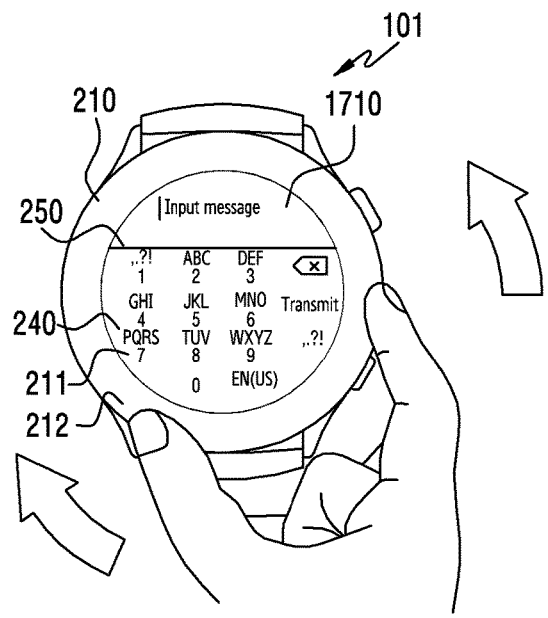
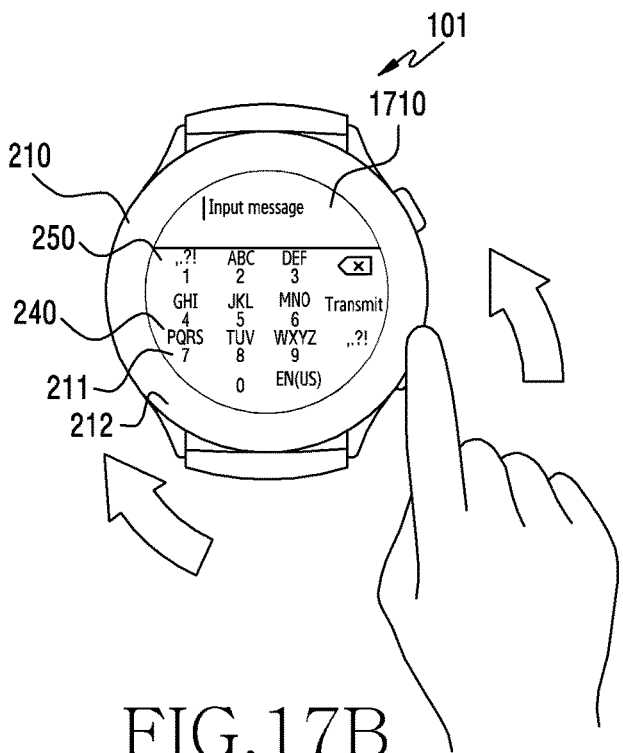
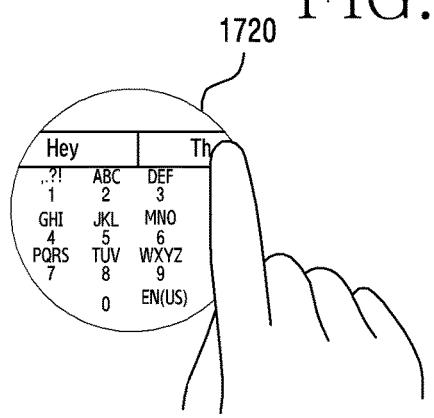
FIG.17A    FIG.17B
FIG.17C

ELECTRONIC DEVICE FOR PROCESSING WHEEL INPUT AND OPERATION METHOD THEREOF

CROSS-REFERENCE TO RELATED APPLICATION(S)

This application is based on and claims priority under 35 U.S.C. § 119 of a Korean patent application number 10-2019-0094427, filed on Aug. 2, 2019, in the Korean Intellectual Property Office, the disclosure of which is incorporated by reference herein in its entirety.

BACKGROUND

1. Field

The disclosure relates to an electronic device for processing a wheel input and an operation method thereof.

2. Description of Related Art

An electronic device may include a wheel input device for obtaining a user input. The electronic device may perform various functions according to a user input applied to the wheel input device.

The above information is presented as background information only to assist with an understanding of the disclosure. No determination has been made, and no assertion is made, as to whether any of the above might be applicable as prior art with regard to the disclosure.

SUMMARY

An electronic device may include a touch screen, and a wheel input region surrounding the touch screen. The width of a wheel input device of the electronic device may be narrower than the width of a user's finger. Thus, when the user touches the edge of the touch screen or applies an input to the wheel input device, the electronic device may simultaneously identify a touch input on the touch screen and a wheel input to the wheel input device. Therefore, when the electronic device simultaneously processes the touch input and the wheel input, the user may be provided with a processing result which the user does not desire.

Aspects of the disclosure are to address at least the above-mentioned problems and/or disadvantages and to provide at least the advantages described below. Accordingly, an aspect of the disclosure is to provide an apparatus and method for obtaining a user input.

Additional aspects will be set forth in part in the description which follows and, in part, will be apparent from the description, or may be learned by practice of the presented embodiments.

In accordance with an aspect of the disclosure, a wearable electronic device is provided. The wearable electronic device includes a cover window, a display disposed under the cover window, a touch panel including one or more touch sensing elements disposed in a region corresponding to the display, the touch panel configured to generate at least one of a touch signal or a proximity signal by using the one or more touch sensing elements, at least one processor operationally connected to the display and the touch panel, and a memory operationally connected to the at least one processor, wherein the memory may store instructions which, when executed by the at least one processor, cause the at least one processor to identify a first touch input in a first region on the cover window, corresponding to the display, by using the touch signal generated by the touch sensing elements, identify a first proximity input in a second region on the cover window, surrounding the display, by using the proximity signal generated by the touch sensing elements, determine whether a designated input determination condition is satisfied, based on the first touch input and the first proximity input, select one of the first touch input in the first region corresponding to the display or the first proximity input in the second region surrounding the display, based on whether the designated input determination condition has been satisfied, and perform a function corresponding to the selected input.

In accordance with another aspect of the disclosure, an operation method of a wearable electronic device is provided. The operation method includes identifying a first touch input in a first region, corresponding to a display of the wearable electronic device, on a cover window of the wearable electronic device, by using a touch signal generated by a touch sensor of the wearable electronic device, identifying a first proximity input in a second region on the cover window, surrounding the display, by using a proximity signal generated by the touch sensor, determining whether a designated input determination condition is satisfied, based on the first touch input and the first proximity input, selecting one of the first touch input in the first region corresponding to the display or the first proximity input in the second region surrounding the display, based on whether the designated input determination condition has been satisfied, and performing a function corresponding to the selected input.

An electronic device according to one embodiment can select and process one of a touch input and a wheel input when the touch input and the wheel input simultaneously occur.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 3A illustrates a situation in which a touch input is applied to an electronic device according to an embodiment of the disclosure;

FIG. 3B illustrates the contact position of a finger at a first time point in the situation in which a touch input is applied to an electronic device according to an embodiment of the disclosure;

FIG. 4 illustrates a table showing an input identified by an electronic device depending on time according to an embodiment of the disclosure;

FIG. 6 illustrates a table showing an input identified by an electronic device depending on time according to an embodiment of the disclosure;

FIG. 8 illustrates a table showing an input identified by an electronic device depending on time according to an embodiment of the disclosure;

FIG. 13A illustrates a situation in which a multi-wheel input is applied to an electronic device according to an embodiment of the disclosure;

FIG. 13B illustrates a situation in which a single-wheel input is applied to an electronic device according to an embodiment of the disclosure;

FIG. 15A illustrates a situation in which a multi-wheel input is applied to an electronic device according to an embodiment of the disclosure;

FIG. 15B illustrates a situation in which a single-wheel input is applied to an electronic device according to an embodiment of the disclosure;

FIG. 15C illustrates a situation in which a configuration value changes depending on a wheel input applied to an electronic device according to an embodiment of the disclosure;

FIG. 17A illustrates a situation in which a multi-wheel input is applied to an electronic device according to an embodiment of the disclosure;

FIG. 17B illustrates a situation in which a single-wheel input is applied to an electronic device according to an embodiment of the disclosure;

FIG. 17C illustrates a situation in which a user interface changes depending on a wheel input applied to an electronic device according to an embodiment of the disclosure;

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
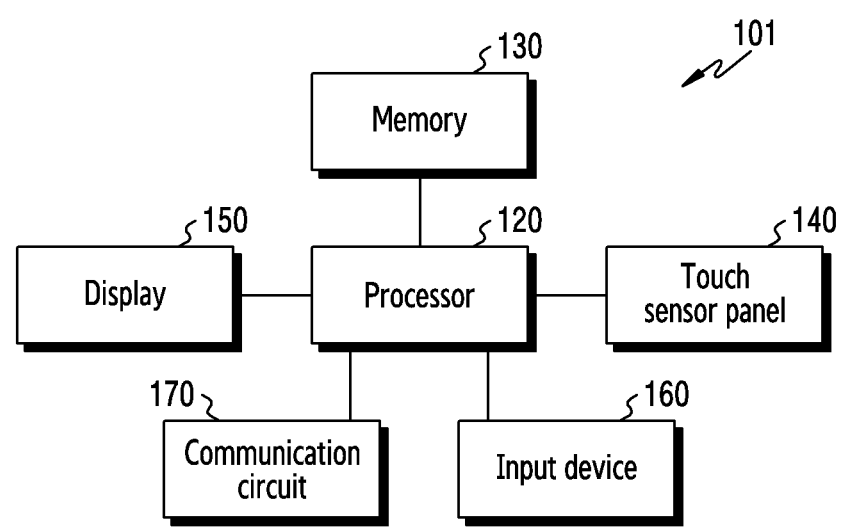
FIG. 1 is a block diagram of an electronic device according to an embodiment of the disclosure.

FIG. 1 is a block diagram of an electronic device according to an embodiment of the disclosure.

Referring to FIG. 1, an electronic device 101 according to one embodiment may include a processor 120, a memory 130, a touch sensor panel 140, a display 150, an input device 160, a communication circuit 170, or a combination thereof. In one embodiment, the electronic device 101 may omit at least one of the elements or may additionally include another element.

In one embodiment, the processor 120 may control overall operations of the electronic device 101. In one embodiment, the processor 120 may execute applications for providing a message, an alarm, a picture, an advertisement, Internet, a game, a moving image, etc. In one embodiment, the processor 120 may include one processor core or may include multiple processor cores.

In one embodiment, the processor 120 may include an application processor (AP), a communication processor (CP), a sensor hub, or a combination thereof.

In one embodiment, the processor 120 may identify signals of other elements of the electronic device 101, or may receive data from the other elements of the electronic device 101. In one embodiment, the processor 120 may perform calculation, based on signals of the other elements of the electronic device 101, data received therefrom, or a combination thereof. In one embodiment, the processor 120 may store the result of performing the calculation in the memory 130. In one embodiment, the processor 120 may transmit commands to the other elements of the electronic device 101, based on the result of performing the calculation. In one embodiment, the processor 120 may control operations of the other elements of the electronic device 101 by transmitting the commands to the other elements of the electronic device 101.

In one embodiment, the processor 120 may process data or a signal generated in an application. In one embodiment, the processor 120 may process a command stored in the memory 130 in order to execute or control the application.

In one embodiment, the memory 130 may include volatile memory or nonvolatile memory. In one embodiment, the memory 130 may store various types of data used by at least one element (e.g. the processor 120) of the electronic device 101.

In one embodiment, the touch sensor panel 140 may include multiple touch sensors for generating signals (e.g. touch signal or proximity signal). In one embodiment, the touch sensor panel 140 may transfer a signal to the processor 120.

In one embodiment, the display 150 may display a screen corresponding to data generated by the processor 120.

In one embodiment, the display 150 and the touch sensor panel 140 may constitute a touch screen. In one embodiment, when the display 150 and the touch sensor panel 140 constitutes the touch screen, the touch sensor panel 140 may be disposed on the display 150, may be disposed beneath the display 150, or may be disposed in the display 150.

In one embodiment, the input device 160 may receive a command or data to be used by an element (e.g. the processor 120) of the electronic device 101 from outside (e.g. a user) of the electronic device 101. In one embodiment, the input device 160 may be formed as a physical button or a logical button.

In one embodiment, the communication circuit 170 may support the establishment of a direct (e.g. wired) communication channel or a wireless communication channel between the electronic device 101 and an external electronic device, and may support communication via the established communication channel. In one embodiment, the communication circuit 170 may include: a wireless communication module (e.g. a cellular communication module, a short-range wireless communication module, or a global navigation satellite system (GNSS) communication module); or a wired communication module (e.g. a local area network (LAN) communication module or a power line communication module).

At least some of the elements may be connected to each other through a communication method between peripheral devices (e.g. a bus, general purpose input and output (GPIO), a serial peripheral interface (SPI), or a mobile industry processor interface (MIP), and may exchange signals (e.g. commands or data) with each other.

Figure 2A:
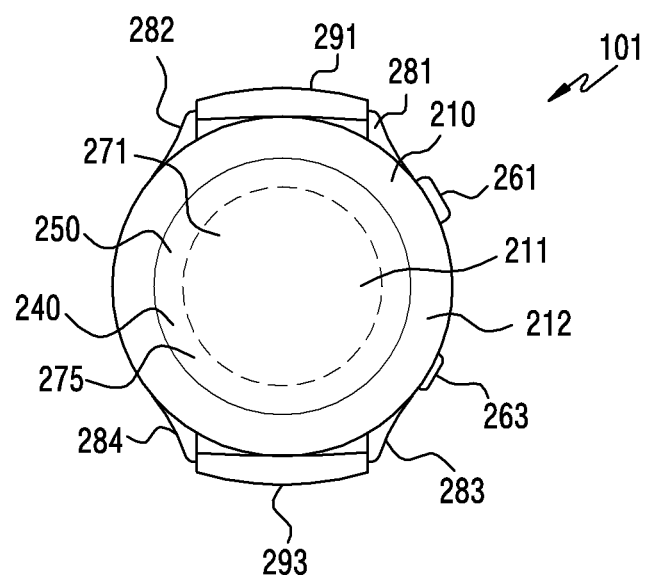
FIG. 2A illustrates the front surface of an electronic device according to an embodiment of the disclosure.

FIG. 2A illustrates the front surface of the electronic device 101 according to an embodiment of the disclosure.

Figure 2B:
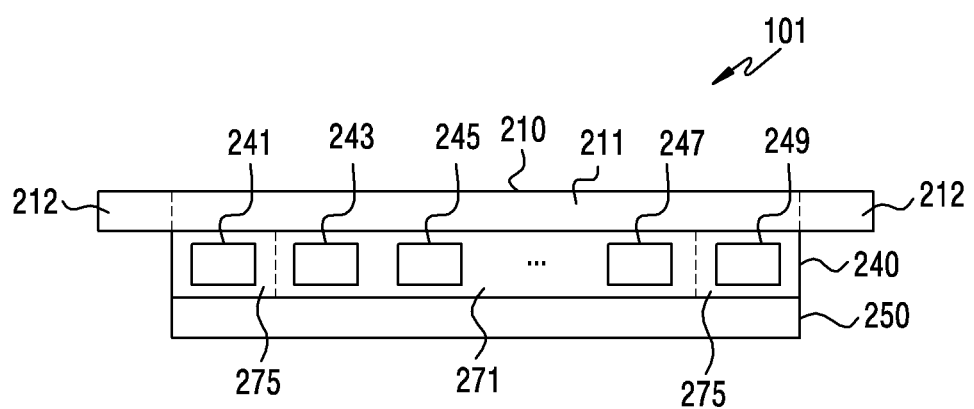
FIG. 2B illustrates a stack structure in which a cover window, a touch sensor panel, and a display of an electronic device are stacked according to an embodiment of the disclosure.

FIG. 2B illustrates a stack structure in which a cover window 210, a touch sensor panel 240, and a display 250 of the electronic device 101 are stacked according to an embodiment of the disclosure.

In one embodiment, FIGS. 2A and 2B may be described with reference to the elements in FIG. 1. In one embodiment, the touch sensor panel 240, the display 250, or buttons 261 and 263 in FIGS. 2A and 2B may be correspond to the touch sensor panel 140, the display 150, or the input device 160 in FIG. 1, respectively. In one embodiment, the cover window 210 may also be called cover glass.

Referring to FIG. 2A, the electronic device 101 may include the cover window 210, the touch sensor panel 240, the display 250, the buttons 261 and 263, locking members 281 to 284, fastening members 291 and 293, or a combination thereof. In one embodiment, the processor 120, the memory 130, or the communication circuit 170 in FIG. 1 are not illustrated in FIG. 2A or 2B. However, the electronic device 101 may include the processor 120, the memory 130, the communication circuit 170, or a combination thereof.

Referring to FIG. 2A, when a user views the electronic device 101 from above, the cover window 210, the buttons 261 and 263, the locking members 281 to 284, and the fastening members 291 and 293 of the electronic device 101 may be seen. Referring to FIG. 2A, when a user views the electronic device 101 from above, the display 250 may be seen through the transparent cover window 210 of the electronic device 101. In one embodiment, when a user views the electronic device 101 from above, the touch sensor panel 240 may be not identified with the naked eye.

In one embodiment, the cover window 210 may be formed of a polymer plate or a glass plate including various coating layers. In one embodiment, the cover window 210 may be made of a transparent material, and thus another element (e.g. the display 250) of the electronic device 101, which is disposed under the cover window 210, may be seen by the user.

In one embodiment, the fastening members 291 and 293 may be detachably fastened to at least a partial region of the electronic device 101 by using the locking members 281 to 284. In one embodiment, the fastening members 291 and 293 may further include a band (not shown) for fixing the electronic device 101 to the body (e.g. the wrist) of the user.

Referring to FIG. 2B, the electronic device 101 may have a structure in which the touch sensor panel 240 is disposed under the cover window 210, and the display 250 is disposed under the touch sensor panel 240. However, this is only an example, and thus the touch sensor panel 240 may be disposed under the display 250, or may be disposed in the display 250.

Referring to FIGS. 2A and 2B, when the electronic device 101 is seen from above, the cover window 210 may be divided into a first region 211 corresponding to the display 250 and a second region 212 surrounding the display 250. Referring to FIGS. 2A and 2B, the touch sensor panel 240 may be disposed in the first region 211 when the electronic device 101 is seen from above. In one embodiment, the first region 211 may be called a "display region". In one embodiment, the second region 212 may be called a "bezel region".

Referring to FIG. 2B, the touch sensor panel 240 may include multiple touch sensors 241 to 249. In one embodiment, the multiple touch sensors 241 to 249 may generate signals (e.g. a touch signal or a proximity signal). In one embodiment, the touch sensor panel 240 may transfer signals of the multiple touch sensors 241 to 249 to the processor 120. In one embodiment, a touch signal may be a designated first electrical signal output by a predetermined touch sensor (e.g. the touch sensor 249) when a predetermined input medium (e.g. a user body (e.g. a finger) or a stylus pen) is positioned within a designated first distance from the predetermined touch sensor (e.g. the touch sensor 249). In one embodiment, a proximity signal may be a designated second electrical signal output by the predetermined touch sensor (e.g. the touch sensor 249) when the predetermined input medium is positioned beyond the designated first distance and within a designated second distance from the predetermined touch sensor (e.g. the touch sensor 249). In one embodiment, a touch signal may be a first electrical signal, the level of which is a designated first level or higher, output by the predetermined touch sensor (e.g. the touch sensor 249). In one embodiment, a proximity signal may be a designated second electrical signal, the level of which is lower than the designated first level and equal to or higher than a designated second level, output by the predetermined touch sensor (e.g. the touch sensor 249). In one embodiment, the first level may be higher than the second level. In one embodiment, each of a pair of touch sensors may output one touch signal for each sensing period. In one embodiment, one touch sensor may output a proximity signal for each sensing period.

Referring to FIGS. 2A and 2B, when the electronic device 101 is seen from above, the touch sensor panel 240 may be divided into: a first sensing region 271 including a center position; and a second sensing region 275 surrounding the first sensing region 271. In one embodiment, the second sensing region 275 may have a designated thickness from the outer edge of the touch sensor panel 240.

Referring to FIG. 2B, some touch sensors 243 to 247 among the multiple touch sensors 241 to 249 may be included in the first sensing region 271. Referring to FIG. 2B, the remaining touch sensors 241 or 249 among the multiple touch sensors 241 to 249 may be included in the second sensing region 275. In one embodiment, the processor 120 may divide the touch sensor panel 240 into the first sensing region 271 and the second sensing region 275. In one embodiment, the processor 120 may configure some touch sensors 243 to 247 among the multiple touch sensors 241 to 249 to be included in the first sensing region 271, and may configure the remaining touch sensors 241 or 249 among the multiple touch sensors 241 to 249 to be included in the second sensing region 275, and thus the touch sensor panel 240 may be divided into the first sensing region 271 and the second sensing region 275.

FIG. 3A illustrates a situation in which a touch input is applied to the electronic device 101 according to an embodiment of the disclosure.

FIG. 3B illustrates the contact position of a finger 301 at a first time point in the situation in which a touch input is applied to the electronic device 101 according to an embodiment of the disclosure.

FIG. 4 illustrates a table showing an input identified by the electronic device 101 depending on time according to an embodiment of the disclosure.

FIGS. 3A, 3B, and 4 may be described with reference to the elements in FIGS. 1, 2A, and 2B.

Referring to FIGS. 3A and 3B, at a first time point T1, a user may bring the finger 301 into contact with the first region 211 of the electronic device 101. Referring to FIGS. 3A and 3B, at the first time point T1, a touch sensor (e.g. the touch sensor 247) corresponding to a contact area 311 of the finger 301 of the user may generate a touch signal. In one embodiment, the touch sensor corresponding to the contact area 311 may include a touch sensor positioned under the contact area 311, a touch sensor surrounding the contact area 311, or a combination thereof, among the multiple touch sensors 241 to 249 included in the touch sensor panel 240. In one embodiment, the touch sensor corresponding to the contact area 311 may include a touch sensor, positioned within a designated first distance from the finger 301, among the multiple touch sensors 241 to 249 of the touch sensor panel 240. In one embodiment, a touch sensor included in the first sensing region 271, a touch sensor included in the second sensing region 275, or a combination thereof may generate a touch signal according to a contact area of the finger 301.

Referring to FIG. 4, at the first time point T1, when a touch signal is generated in the touch sensor panel 240, the processor 120 may identify a detection status in a display region as initial detecting. Referring to FIG. 4, at the first time point T1, the processor 120 may identify a touch status in the display region as "touch-down", based on the detection status in the display region.

Referring to FIG. 4, at the first time point T1, when a proximity signal is not generated in the touch sensor included in the second sensing region 275 of the touch sensor panel 240, the processor 120 may identify a detection status in a bezel region as "not-detecting". Referring to FIG. 4, at the first time point T1, the processor 120 may identify a wheel status in the bezel region as "null", based on the detection status in the bezel region. In one embodiment, "null" in the wheel status may refer to a state in which the wheel status is not classified as one among designated wheel statuses. In one embodiment, the display region may correspond to the first region 211. In one embodiment, the bezel region may correspond to the second region 212.

Referring to FIG. 3A, at a second time point T2, the finger 301 of the user may move to a second contact position different from a first contact position at the first time point T1 while being in contact with the first region 211 of the electronic device 101. Referring to FIG. 3A, at the second time point T2, a touch sensor (e.g. the touch sensor 247 and the touch sensor 249) corresponding to a contact area 312 of the finger 301 of the user may generate a touch signal. In one embodiment, the time interval between the first time point T1 and the second time point T2 may be a predesignated time interval (e.g. 10 milliseconds).

Referring to FIG. 4, at the second time point T2, when a touch signal is generated in the touch sensor panel 240, the processor 120 may identify a detection status in the display region as "detecting". Referring to FIG. 4, at the second time point T2, the processor 120 may identify a touch status in the display region as "touch-move", based on the detection state in the display region.

Referring to FIG. 4, at the second time point T2, when a proximity signal is not generated in the touch sensor included in the second sensing region 275 of the touch sensor panel 240, the processor 120 may identify a detection status in the bezel region as "not-detecting". Referring to FIG. 4, at the second time point T2, the processor 120 may identify a wheel status in the bezel region as "null", based on the detection status in the bezel region.

Referring to FIG. 3A, at a third time point T3, the finger 301 of the user may move to a third contact position different from the second contact position at the second time point T2 while being in contact with the first region 211 of the electronic device 101. Referring to FIG. 3A, at the third time point T3, a touch sensor (e.g. the touch sensor 249) corresponding to a contact area 313 of the finger 301 of the user may generate a touch signal.

Referring to FIG. 4, at the third time point T3, when a touch signal is generated in the touch sensor panel 240, the processor 120 may identify a detection status in the display region as "detecting". Referring to FIG. 4, at the second time point T3, the processor 120 may identify a touch status in the display region as "touch-move", based on the detection state in the display region.

Referring to FIG. 4, at the third time point T3, when a proximity signal is not generated in the touch sensor included in the second sensing region 275 of the touch sensor panel 240, the processor 120 may identify a detection status in the bezel region as "not-detecting". Referring to FIG. 4, at the third time point T3, the processor 120 may identify a wheel status in the bezel region as "null", based on the detection status in the bezel region.

Referring to FIG. 3A, at a fourth time point T4, the user may release the contact between the finger 301 and the first region 211. Referring to FIG. 3A, when the contact between the finger 301 of the user and the first region 211 is released at the fourth time point T4, the multiple touch sensors may not generate touch signals. In one embodiment, when the contact between the finger 301 of the user and the first region 211 is released, and thus the distance between each of the multiple touch sensors and the finger 301 of the user is equal to or greater than a first distance, the multiple touch sensors may not generate touch signals.

Referring to FIG. 4, at the fourth time point T4, when a touch signal is not generated in the touch sensor panel 240, the processor 120 may identify a detection status in the display region as "not-detecting". Referring to FIG. 4, at the fourth time point T4, the processor 120 may identify a touch status in the display region as "null", based on the detection status in the display region. In one embodiment, "null" in the touch status may refer to a state in which the touch status is not classified as one among designated touch statuses.

Referring to FIG. 4, at the fourth time point T4, when a proximity signal is not generated in the touch sensor included in the second sensing region 275 of the touch sensor panel 240, the processor 120 may identify a detection status in the bezel region as "not-detecting". Referring to FIG. 4, at the second time point T4, the processor 120 may identify a wheel status in the bezel region as "null", based on the detection status in the bezel region.

Referring to FIG. 3A, at a fifth time point T5, the finger 301 of the user may remain in the state in which the contact with the first region 211 is released. Referring to FIG. 3A, at the fifth time point T5, when the finger 301 remains in the state in which the contact with the first region 211 is released, the multiple touch sensors may not generate touch signals. In one embodiment, when the finger 301 remains in the state in which the contact with the first region 211 is released, and the distance between each of the multiple touch sensors and the finger 301 of the user is equal to or greater than the first distance, the multiple touch sensors may not generate touch signals.

Referring to FIG. 4, at the fifth time point T5, when a touch signal is not generated in the touch sensor panel 240, the processor 120 may identify a detection status in the display region as "not-detecting". Referring to FIG. 4, at the fifth time point T5, the processor 120 may identify a touch status in the display region as "touch-up", based on the detection status in the display region. In one embodiment, when a detection status in the display region has been identified as "not-detecting" a designated number of times (e.g. twice) since initial touch, the processor 120 may identify a touch status in the display region not as "null" but as "touch-up", based on the designated number of times of "not-detecting" in the display region. In one embodiment, "touch-up" may be a touch state for indicating that the user has released contact with the display 250 of the electronic device 101.

Referring to FIG. 4, at the fifth time point T5, when a proximity signal is not generated in the touch sensor included in the second sensing region 275 of the touch sensor panel 240, the processor 120 may identify a detection status in the bezel region as "not-detecting". Referring to FIG. 4, at the fifth time point T5, the processor 120 may identify a wheel status in the bezel region as "null", based on the detection status in the bezel region.

In one embodiment, the processor 120 may perform a function corresponding to an input that is indicated by a combination of touch statuses in the display region, which are indicated by multiple touch signals, respectively. In one embodiment, the input, indicated by a combination of touch statuses in the display region which are indicated by multiple touch signals, respectively, may be called a "touch input".

In one embodiment, when a touch movement exceeding a predetermined distance from a first touch center position (e.g. the center position of the contact area 311) on the display 250, on which a touch-down has been identified, is identified, the processor 120 may the touch movement as movement input corresponding to the distance between the first touch center position (e.g. the center position of the contact area 311) and a second touch center position (e.g. the center position of the contact area 312) on the display 250 on which the touch movement has been identified. In one embodiment, the processor 120 may identify the completion (or end) of the movement input when a touch-up is identified after the touch movement exceeding the predetermined distance from the first touch center position (e.g. the center position of the contact area 311) on the display 250, on which the touch-down has been identified, is identified. In one embodiment, the processor 120 may identify the movement input as input by at least one among a swipe, a drag, a flick, or a pan, based on the movement direction, movement speed, or whether touch-up is identified between the first touch center position (e.g. the center position of the contact area 311) and the second touch center position (e.g. the center position of the contact area 312). For example, when drag input is identified, the processor 120 may replace a page displayed on the display 250 with another page.

However, the input is merely an example, and thus inputs are not limited to the examples described above. In one embodiment, the input indicated by the combination of touch statuses in the display region, which are indicated by the multiple touch signals, may include a press, a long-press, a swipe, a drag, a flick, a pan, a tap, pinch-open, or pinch-close.

In one embodiment, when a touch movement is identified within the predetermined distance from the first touch center position on the display 250 on which touch-down has been identified is identified, and a touch-up is identified within a predetermined time after the touch down has been identified, the processor 120 may identify the touch movement as input for performing a function corresponding to a visual object located in the first touch center position on the display 250. For example, in the above-described situation, when the visual object located in the first touch center position is an icon, the processor 120 may execute an application corresponding to the icon.

In one embodiment, when a touch movement is identified within the predetermined distance from the first touch center position on the display 250 on which touch-down has been identified is identified, but touch-up is not identified within the predetermined time after the touch down has been identified, the processor 120 may identify the touch movement as input for performing a function of selecting a visual object located in the first touch center position on the display 250. For example, in the above-described situation, when the visual object located in the first touch center position is an icon, the processor 120 may execute an application corresponding to the icon. For example, in the above-described situation, when the visual object located in the first touch center position is an icon, the processor 120 may display the icon in a floated state through the display 250.

Figure 5:
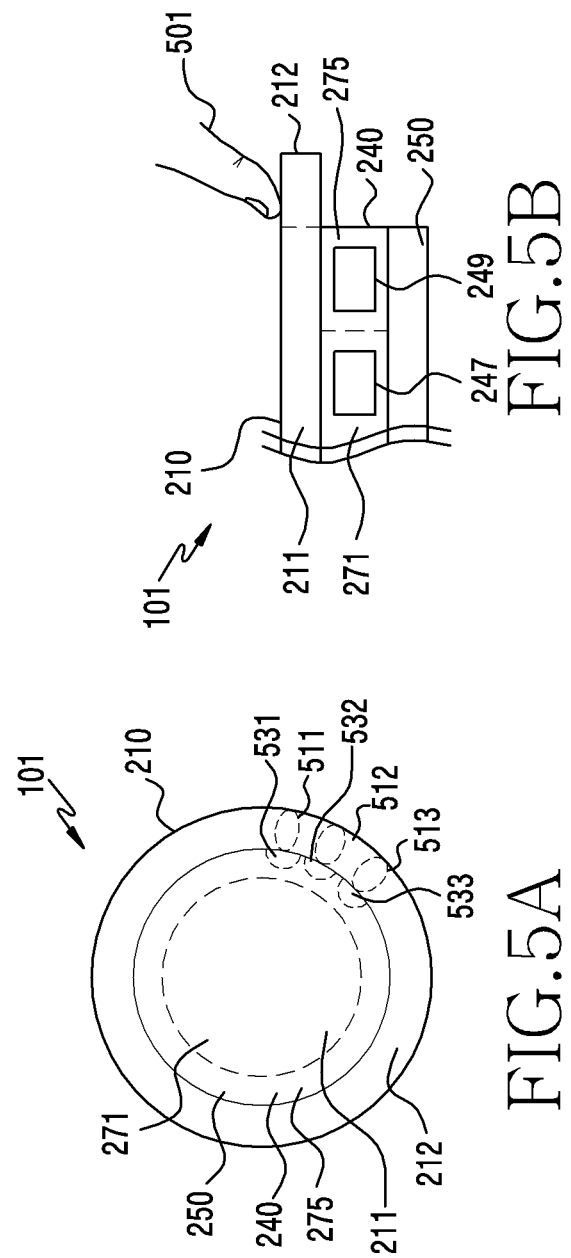
FIG. 5A illustrates a situation in which a proximity input is applied to an electronic device according to an embodiment of the disclosure.
FIG. 5B illustrates a contact position at a first time point in the situation in which a proximity input is applied to an electronic device according to an embodiment of the disclosure.

FIG. 5A illustrates a situation in which a proximity input is applied to the electronic device 101 according to an embodiment of the disclosure.

FIG. 5B illustrates a contact position at a first time point in the situation in which a proximity input is applied to the electronic device 101 according to an embodiment of the disclosure.

FIG. 6 illustrates a table showing statuses identified by the electronic device depending on time according to an embodiment of the disclosure.

FIGS. 5A, 5B, and 6 may be described with reference to the elements in FIGS. 1, 2A, and 2B.

Referring to FIGS. 5A and 5B, at a first time point T1, a user may bring a finger 501 into contact with the second region 212 of the electronic device 101. Referring to FIGS. 5A and 5B, at the first time point T1, a touch sensor (e.g. the touch sensor 249) adjacent to a contact area 511 of the finger 501 of the user may generate a proximity signal. In one embodiment, the touch sensor adjacent to the contact area 511 may include a touch sensor, adjacent to the contact area 511, among the multiple touch sensors 241 to 249 included in the touch sensor panel 240. In one embodiment, the touch sensor adjacent to the contact area 511 may include a touch sensor, adjacent to the contact area 511, among the multiple touch sensors included in the second sensing region 275 of the touch sensor panel 240. In one embodiment, the touch sensor adjacent to the contact area 511 may include a touch sensor, which is positioned beyond a designated first distance from and within a designated second distance from the finger 501, among the multiple touch sensors included in the second sensing region 275 of the touch sensor panel 240. Referring to FIGS. 5A and 5B, a touch sensor included in a sensing region 531, which is adjacent to the contact area 511 and is a region of the second sensing region 275, may generate a proximity signal.

Referring to FIG. 6, at the first time point T1, when a proximity signal is generated in the touch sensor included in the second sensing region 275 of the touch sensor panel 240, the processor 120 may identify a detection status in a bezel region as "initial detecting". Referring to FIG. 6, at the first time point T1, the processor 120 may identify a wheel status in the bezel region as "initial", based on the detection status in the bezel region. In one embodiment, the initial status may refer to a state in which a proximity signal has been initially detected in the bezel region. In one embodiment, when a proximity signal indicates the initial status, the processor 120 may identify a wheel input according to a subsequent proximity signal.

Referring to FIG. 6, at the first time point T1, when a touch signal is not generated in the touch sensor panel 240, the processor 120 may identify a detection status in a display region as "not-detecting". Referring to FIG. 6, at the first time point T1, the processor 120 may identify a touch status in the display region as "null", based on the detection status in the display region. In one embodiment, the display region may correspond to the first region 211. In one embodiment, the bezel region may correspond to the second region 212.

Referring to FIG. 5A, at a second time point T2, the user may move the finger 501 to a second contact position different from a first contact position at the first time point T1 while the finger 501 is in contact with the second region 212 of the electronic device 101. Referring to FIG. 5A, at the second time point T2, a touch sensor (e.g. the touch sensor 249) adjacent to a contact area 512 of the finger 501 of the user may generate a proximity signal. Referring to FIG. 5A, a touch sensor included in a sensing region 532, which is adjacent to the contact area 512 and is a region of the second sensing region 275, may generate a proximity signal. In one embodiment, the time interval between the first time point T1 and the second time point T2 may be a predesignated time interval (e.g. 10 milliseconds). In one embodiment, when the detection status in the bezel region at the first time point T1 is "detecting (or initial detecting)", the time interval between the first time point T1 and the second time point T2 may be shorter than the predesignated time interval (e.g. 10 milliseconds).

Referring to FIG. 6, at the second time point T2, when a proximity signal is generated in the touch sensor included in the second sensing region 275 of the touch sensor panel 240, the processor 120 may identify a detection status in the bezel region as "detecting". Referring to FIG. 6, at the second time point T2, the processor 120 may identify a wheel status in the bezel region as "wheel", based on the detection status in the bezel region.

Referring to FIG. 6, at the second time point T2, when a touch signal is not generated in the touch sensor panel 240, the processor 120 may identify a detection status in the display region as "not-detecting". Referring to FIG. 6, at the second time point T2, the processor 120 may identify a touch status in the display region as "null", based on the detection status in the display region.

Referring to FIG. 5A, at a third time point T3, the user may move the finger 501 to a third contact position different from the second contact position at the second time point T2 while the finger 501 is in contact with the second region 212 of the electronic device 101. Referring to FIG. 5A, at the third time point T3, a touch sensor (e.g. the touch sensor 249) adjacent to a contact area 513 of the finger 501 of the user may generate a proximity signal. Referring to FIG. 5A, a touch sensor included in a sensing region 533, which is adjacent to the contact area 513 and is a region of the second sensing region 275, may generate a proximity signal.

Referring to FIG. 6, at the third time point T3, when a proximity signal is generated in the touch sensor included in the second sensing region 275 of the touch sensor panel 240, the processor 120 may identify a detection status in the bezel region as "detecting". Referring to FIG. 6, at the third time point T3, the processor 120 may identify a wheel status in the bezel region as "wheel", based on the detection status in the bezel region.

Referring to FIG. 6, at the third time point T3, when a touch signal is not generated in the touch sensor panel 240, the processor 120 may identify a detection status in the display region as "not-detecting". Referring to FIG. 6, at the third time point T3, the processor 120 may identify a touch status in the display region as "null", based on the detection status in the display region.

Referring to FIG. 5A, at a fourth time point T4, the user may release the contact between the finger 501 and the second region 212. Referring to FIG. 5A, at the fourth time point T4, when the contact between the finger 501 of the user and the second region 212 is released, the multiple touch sensors may not generate proximity signals. In one embodiment, when the contact between the finger 501 of the user and the second region 212 is released, and thus the distance between each of the multiple touch sensors and the finger 501 of the user is equal to or greater than the second distance, the multiple touch sensors may not generate proximity signals.

Referring to FIG. 6, at the fourth time point T4, when a proximity signal is not generated in the touch sensor included in the second sensing region 275 of the touch sensor panel 240, the processor 120 may identify a detection status in the bezel region as "not-detecting". Referring to FIG. 6, at the fourth time point T4, the processor 120 may identify a wheel status in the bezel region as "null", based on the detection status in the bezel region.

Referring to FIG. 6, at the fourth time point T4, when a touch signal is not generated in the touch sensor panel 240, the processor 120 may identify a detection status in the display region as "not-detecting". Referring to FIG. 6, at the fourth time point T4, the processor 120 may identify a touch status in the display region as "null", based on the detection status in the display region.

Referring to FIG. 5A, at a fifth time point T5, the finger 501 of the user may remain in the state in which the contact with the second region 212 is released. Referring to FIG. 5A, at the fifth time point T5, when the finger 501 remains in the state in which the contact with the second region 212 is released, the multiple touch sensors may not generate proximity signals. In one embodiment, when the finger 501 remains in the state in which the contact with the second region 212 is released, and the distance between each of the multiple touch sensors and the finger 501 of the user is equal to or greater than the second distance, the multiple touch sensors may not generate proximity signals.

Referring to FIG. 6, at the fifth time point T5, when a proximity signal is not generated in the touch sensor included in the second sensing region 275 of the touch sensor panel 240, the processor 120 may identify a detection status in the bezel region as "not-detecting". Referring to FIG. 6, at the fifth time point T5, the processor 120 may identify a wheel status in the bezel region as "null", based on the detection status in the bezel region.

Referring to FIG. 6, at the fifth time point T5, when a touch signal is not generated in the touch sensor panel 240, the processor 120 may identify a detection status in the display region as "not-detecting". Referring to FIG. 6, at the fifth time point T5, the processor 120 may identify a touch status in the display region as "null", based on the detection status in the display region.

In one embodiment, the processor 120 may perform a function corresponding to an input that is indicated by a combination of wheel statuses in the bezel region, which are indicated by multiple proximity signals, respectively. In one embodiment, the input, indicated by a combination of wheel statuses in the bezel region which are indicated by multiple proximity signals, respectively, may include a wheel input. In one embodiment, the input, indicated by a combination of wheel statuses in the bezel region which are indicated by multiple proximity signals, respectively, may be called a "proximity input".

In one embodiment, the processor 120 may identify the movement of a wheel input, based on the distance between a first proximity center position on the display 250 according to a first proximity signal and a second proximity center position on the display 250 according to a second proximity signal subsequent to the first proximity signal. In one embodiment, the processor 120 may identify the movement of a wheel input, based on the angle between the first proximity center position and the second proximity center position.

In one embodiment, the processor 120 may identify the direction of a wheel input, based on the direction of movement from the first proximity center position to the second proximity center position (e.g. the clockwise direction or the counterclockwise direction).

In one embodiment, the processor 120 may perform functions according to a wheel input, based on the movement and direction of the wheel input.

In one embodiment, the processor 120 may identify two or more wheel inputs, based on multiple proximity signals at two or more points spaced apart from each other. In one embodiment, the processor 120 may identify two or more wheel inputs, based on touch signal position information. In one embodiment, the processor 120 may identify two or more wheel input as a multi-wheel input. In one embodiment, the processor 120 may identify one wheel input as a single wheel input.

In one embodiment, the processor 120 may identify the movement of a multi-wheel input. In one embodiment, the processor 120 may identify the direction of a multi-wheel input. In one embodiment, the processor 120 may perform functions according to a multi-wheel input, based on the movement and direction of the multi-wheel input.

In one embodiment, the processor 120 may provide the movement of a multi-wheel input with a weighted value higher than that provided to the movement of a single-wheel input. For example, when a function according to a wheel input is page movement and the movement of a multi-wheel input is identical to the movement of a single-wheel input, page movement according to the multi-wheel input may be greater than the page movement according to the single-wheel input.

In one embodiment, the degree of adjustment of a user interface by a reference movement distance of a multi-wheel input while the multi-wheel input is identified may be higher than the degree of adjustment of the user interface by a reference movement distance of a single-wheel input while the single-wheel input is identified.

Figure 7:
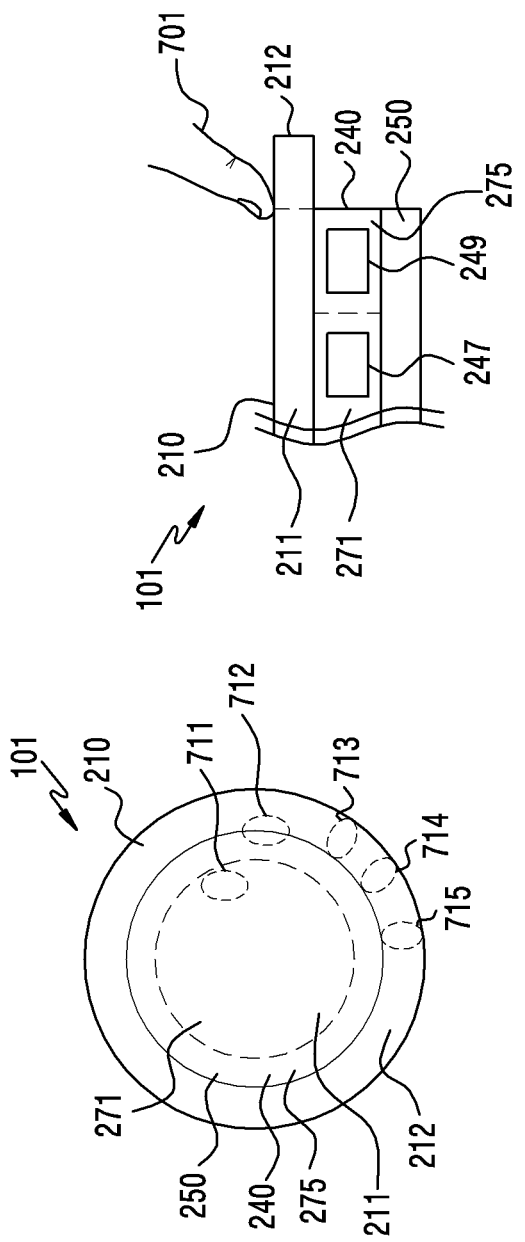
FIG. 7A illustrates a situation in which a touch input and a proximity input to an electronic device compete with each other according to an embodiment of the disclosure.
FIG. 7B illustrates a contact position at second time point in the situation in which a touch input and a proximity input to an electronic device compete with each other according to an embodiment of the disclosure.

FIG. 7A illustrates a situation in which a touch input and a proximity input to the electronic device 101 compete with each other according to an embodiment of the disclosure.

FIG. 7B illustrates a contact position at second time point in the situation in which a touch input and a proximity input to the electronic device 101 compete with each other according to an embodiment of the disclosure.

FIG. 8 illustrates a table showing statuses identified by the electronic device 101 depending on time according to an embodiment of the disclosure.

FIGS. 7A, 7B, and 8 may be described with reference to the elements in FIGS. 1, 2A, and 2B.

Referring to FIGS. 7A and 7B, at a first time point T1, a user may bring a finger 701 into contact with the first region 211 of the electronic device 101. Referring to FIGS. 7A and 7B, at the first time point T1, a touch sensor (e.g. the touch sensor 247) corresponding to a contact area 711 of the finger 701 of the user may generate a touch signal. In one embodiment, the touch sensor corresponding to the contact area 711 may include a touch sensor positioned under the contact area 711, a touch sensor surrounding the contact area 711, or a combination thereof, among the multiple touch sensors 241 to 249 included in the touch sensor panel 240. In one embodiment, the touch sensor corresponding to the contact area 711 may include a touch sensor, positioned within a designated first distance from the finger 701, among the multiple touch sensors 241 to 249 of the touch sensor panel 240. In one embodiment, a touch sensor included in the first sensing region 271, a touch sensor included in the second sensing region 275, or a combination thereof may generate a touch signal according to a contact area of the finger 701.

Referring to FIG. 8, at the first time point T1, when a touch signal is generated in the touch sensor panel 240, the processor 120 may identify a detection status in a display region as initial detecting. Referring to FIG. 8, at the first time point T1, the processor 120 may identify a touch status in the display region as "touch-down", based on the detection status in the display region.

Referring to FIG. 8, at the first time point T1, when a proximity signal is not generated in the touch sensor included in the second sensing region 275 of the touch sensor panel 240, the processor 120 may identify a detection status in a bezel region as "not-detecting". Referring to FIG. 8, at the first time point T1, the processor 120 may identify a wheel status in the bezel region as "null", based on the detection status in the bezel region. In one embodiment, the display region may correspond to the first region 211. In one embodiment, the bezel region may correspond to the second region 212.

Referring to FIG. 7A, at a second time point T2, the user may move the finger 701 to a second contact position different from a first contact position at the first time point T1 while the finger 701 is in contact with the cover window 210 of the electronic device 101. Referring to FIG. 7A, the first contact position at the first time point T1 may be located in the first region 211, and the second contact position at the second time point T2 may be located on a boundary portion between the first region 211 and the second region 212. Referring to FIG. 7A, the contact area 711 at the first time point T1 may be located in the first region 211, and a contact area 712 at the second time point T2 may be located over the first region 211 and the second region 212.

Referring to FIG. 7A, at the second time point T2, a touch sensor (e.g. the touch sensor 247 and the touch sensor 249) corresponding to the contact area 712 of the finger 701 of the user may generate a touch signal.

Referring to FIG. 7A, at the second time point T2, a touch sensor (e.g. the touch sensor 249) adjacent to the contact area 712 of the finger 701 of the user may generate a proximity signal. In one embodiment, the touch sensor adjacent to the contact area 712 may include a touch sensor, adjacent to the contact area 712, among the multiple touch sensors 241 to 249 included in the touch sensor panel 240. In one embodiment, the touch sensor adjacent to the contact area 712 may include a touch sensor, adjacent to the contact area 712, among the multiple touch sensors included in the second sensing region 275 of the touch sensor panel 240. In one embodiment, the touch sensor adjacent to the contact area 712 may include a touch sensor, which is positioned beyond a designated first distance from and within a designated second distance from the finger 701, among the multiple touch sensors included in the touch sensor panel 240.

Referring to FIG. 8, at the second time point T2, when a touch signal is generated in the touch sensor panel 240, the processor 120 may identify a detection status in the display region as "detecting". Referring to FIG. 8, at the second time point T2, the processor 120 may identify a touch status in the display region as "touch-move", based on the detection state in the display region.

Referring to FIG. 8, at the second time point T2, when a proximity signal is generated in the touch sensor included in the second sensing region 275 of the touch sensor panel 240, the processor 120 may identify a detection status in the bezel region as "initial detecting". Referring to FIG. 8, at the second time point T2, the processor 120 may identify a wheel status in the bezel region as "initial", based on the detection status in the bezel region.

In one embodiment, when a touch signal and a proximity signal are simultaneously generated, the processor 120 may recognize this situation to be a situation in which a first input according to the touch signal competes with a second input according to the proximity signal. In one embodiment, when the proximity signal is generated while the first input according to the touch signal is in progress, the processor 120 may recognize this situation to be a situation in which the first input and the second input compete with each other. In one embodiment, when the touch signal is generated while the second input according to the proximity signal is in progress, the processor 120 may recognize this situation to be a situation in which the first input and the second input compete with each other. In one embodiment, the first input may be an input indicated by a combination of touch statuses in the display region. In one embodiment, the second input may be an input indicated by a combination of wheel statuses in the bezel region. In one embodiment, an unfinished input may be identified as an input in progress. In one embodiment, the first input may be identified as an input in progress until a touch status in the display region indicates "touch-up". In one embodiment, the second input may be identified as an input in progress while a wheel status in the bezel region indicates "wheel".

In one embodiment, in the situation in which the touch signal and the proximity signal compete with each other, the processor 120 may determine an input of one of the first input and the second input, based on a predesignated condition.

In one embodiment, the predesignated condition may be that a touch signal is generated in a designated first distance condition range from the outer edge of the touch sensor panel 240. In one embodiment, the predesignated condition may be that a touch signal is generated in the second region 212 of the touch sensor panel 240. In one embodiment, the processor 120 may determine the second input among the first input and the second input when the predesignated condition is satisfied.

In one embodiment, the predesignated condition may be that a proximity signal generation time is within a predesignated first time condition range with reference to a touch signal generation time. In one embodiment, when the predesignated condition is satisfied, the processor 120 may determine the second input among the first input and the second input.

In one embodiment, the predesignated condition may be that a proximity signal generation position is within a designated second distance condition range from a touch signal generation position. In one embodiment, when the predesignated condition is satisfied, the processor 120 may determine the second input among the first input and the second input.

In one embodiment, the predesignated condition may be that the angle formed by a designated center position, a proximity signal generation position, and a touch signal generation position in the touch sensor panel 240 is within a first angle condition range. In one embodiment, when the predesignated condition is satisfied, the processor 120 may determine the second input among the first input and the second input.

In one embodiment, the predesignated condition may be identification of a wheel input by a continuous proximity signal. In one embodiment, when the predesignated condition is satisfied, the processor 120 may determine the second input among the first input and the second input.

In one embodiment, the predesignated condition may be identification of a multi-wheel input by proximity signals spaced apart from each other. In one embodiment, when the predesignated condition is satisfied, the processor 120 may determine the second input among the first input and the second input.

In one embodiment, the processor 120 may ignore and/or cancel the other input which has not been selected from among the first input and the second input.

Referring to FIG. 8, at the second time point T2, since the touch signal and the proximity signal have been simultaneously generated, the processor 120 may recognize this situation as a situation in which the first input according to the touch signal competes with the second input according to the proximity signal. In one embodiment, since the proximity signal has been generated in the second region 212, the processor 120 may determine that the predesignated condition has been satisfied. In one embodiment, among the first input according to the touch signal and the second input according to the proximity signal, the processor 120 may determine the second input. In one embodiment, the processor 120 may ignore and/or cancel the first input which has not been selected from among the first input and the second input.

Referring to FIG. 7A, at a third time point T3, the user may move the finger 701 to a third contact position different from the second contact position at the second time point T2 while the finger 701 is in contact with the cover window 210 of the electronic device 101. Referring to FIG. 7A, the third contact position at the third time point T3 may be located in the second region 212. Referring to FIG. 7A, a contact area 713 at the third time point T3 may be located in the second region 212.

Referring to FIG. 7A, at the third time point T3, as the contact area 713 of the finger 701 of the user is located in the second region 212, the touch sensor panel 240 may not generate a touch signal.

Referring to FIG. 7A, at the third time point T3, a touch sensor (e.g. the touch sensor 249) adjacent to the contact area 713 of the finger 701 of the user may generate a proximity signal.

Referring to FIG. 8, at the third time point T3, when a touch signal is not generated in the touch sensor panel 240, the processor 120 may identify a detection status in the display region as "not-detecting". Referring to FIG. 8, at the third time point T3, the processor 120 may identify a touch status in the display region as "null", based on the detection status in the display region.

Referring to FIG. 8, at the third time point T3, when a proximity signal is generated in the touch sensor included in the second sensing region 275 of the touch sensor panel 240, the processor 120 may identify a detection status in the bezel region as "detecting". Referring to FIG. 8, at the third time point T3, the processor 120 may identify a wheel status in the bezel region as "wheel", based on the detection status in the bezel region.

Referring to FIG. 8, at the third time point T3, since the touch signal and the proximity signal have been simultaneously generated, the processor 120 may recognize this situation as a situation in which the first input according to the touch signal competes with the second input according to the proximity signal. In one embodiment, since a wheel input is identified by a continuous proximity signal, the processor 120 may determine that the predesignated condition has been satisfied. In one embodiment, among the first input according to the touch signal and the second input according to the proximity signal, the processor 120 may determine the second input. In one embodiment, the processor 120 may ignore and/or cancel the first input which has not been selected from among the first input and the second input.

Referring to FIG. 7A, at a fourth time point T4, the user may move the finger 701 to a fourth contact position different from the third contact position at the third time point T3 while the finger 701 is in contact with the second region 212 of the electronic device 101. Referring to FIG. 7A, the fourth contact position at the fourth time point T4 may be located in the second region 212. Referring to FIG. 7A, a contact area 714 at the fourth time point T4 may be located in the second region 212.

Referring to FIG. 7A, at the fourth time point T4, as the contact area 714 of the finger 701 of the user is located in the second region 212, the touch sensor panel 240 may not generate a touch signal.

Referring to FIG. 7A, at the fourth time point T4, a touch sensor (e.g. the touch sensor 249) adjacent to the contact area 714 of the finger 701 of the user may generate a proximity signal.

Referring to FIG. 8, at the fourth time point T4, when a touch signal is not generated in the touch sensor panel 240, the processor 120 may identify a detection status in the display region as "not-detecting". In one embodiment, in a non-competitive situation, when a detection status in the display has been identified as "not-detecting" a designated number of times (e.g. twice) since initial touch, the processor 120 may identify a touch status in the display region not as "null" but as "touch-up". However, since FIGS. 7A, 7B, and 8 illustrate a competitive situation at the fourth time point T4, and the second input has been determined among the first input according to the touch signal and the second input according the proximity signal. Therefore, the processor 120 may identify a touch status in the display region not as "null" or "touch-up" but as "touch-cancel", and thus may ignore and/or cancel the unselected first input. In one embodiment, as "touch-cancel" is identified, the processor 120 may restore the status as if a function according to the first input at the first to third time T1 to T3 has not been performed.

Referring to FIG. 8, at the fourth time point T4, a proximity signal is generated in the touch sensor panel 240, the processor 120 may identify a detection status in the bezel region as "detecting". Referring to FIG. 8, at the fourth time point T4, the processor 120 may identify a wheel status in the bezel region as "wheel", based on the detection status in the bezel region.

Referring to FIG. 7A, at a fifth time point T5, the user may move the finger 701 to a fifth contact position different from the fourth contact position at the fourth time point T4 while the finger 701 is in contact with the second region 212 of the electronic device 101. Referring to FIG. 7A, the fifth contact position at the fifth time point T5 may be located in the second region 212. Referring to FIG. 7A, a contact area 715 at the fifth time point T5 may be located in the second region 212.

Referring to FIG. 7A, at the fifth time point T5, as the contact area 715 of the finger 701 of the user is located in the second region 212, the touch sensor panel 240 may not generate a touch signal.

Referring to FIG. 7A, at the fifth time point T5, a touch sensor (e.g. the touch sensor 249) corresponding to the contact area 715 of the finger 701 of the user may generate a proximity signal. In one embodiment, the touch sensor corresponding to the contact area 715 may include a touch sensor, which is adjacent to the contact area 715, among the multiple touch sensors 241 to 249 included in the touch sensor panel 240. In one embodiment, the touch sensor corresponding to the contact area 715 may include a touch sensor, which is positioned beyond the designated first distance from and within the designated second distance from the finger 701, among the multiple touch sensor included in the touch sensor panel 240.

Referring to FIG. 8, at the fifth time point T5, when a touch signal is not generated in the touch sensor panel 240, the processor 120 may identify a detection status in the display region as "not-detecting". Referring to FIG. 8, at the fifth time point T5, the processor 120 may identify a touch status in the display region as "null", based on the detection status in the display region.

Referring to FIG. 8, at the fourth time point T5, when a proximity signal is generated in the touch sensor panel 240, the processor 120 may identify a detection status in the bezel region as "detecting". Referring to FIG. 8, the processor 120 may identify a wheel status in the bezel region as "wheel", based on the detection status in the bezel region.

Figure 9:
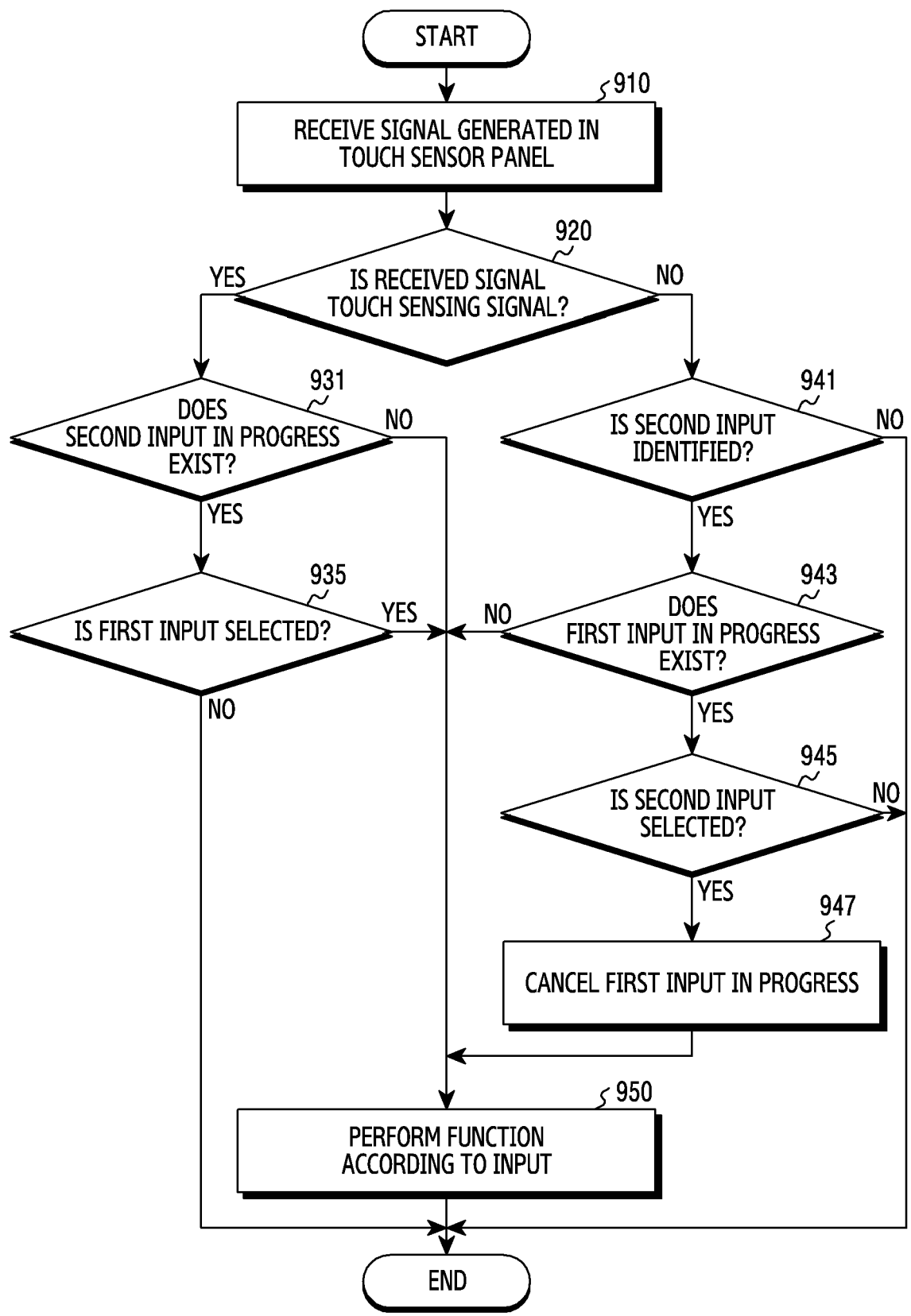
FIG. 9 is a flowchart illustrating processing being performed according to a signal in an electronic device according to an embodiment of the disclosure.

FIG. 9 is a flowchart illustrating processing being performed according to an input in the electronic device 101 according to an embodiment of the disclosure.

FIG. 9 may be described with reference to the elements in FIGS. 1, 2A, and 2B.

Referring to FIG. 9, in operation 910, the processor 120 of the electronic device 101 may receive a signal generated in the touch sensor panel 240.

In operation 920, the processor 120 may determine whether the received signal is a touch signal. When the received signal is determined to be a touch signal in operation 920 ("Yes" determination), the processor 120 may perform operation 931. When the received signal is determined to be a proximity signal in operation 920 ("No" determination), the processor 120 may perform operation 941.

In operation 931, the processor 120 may determine whether a second input in progress exists. When the second input in progress is determined to exist in operation 931 ("Yes" determination), the processor 120 may perform operation 935. When the second input in progress is determined not to exist in operation 931 ("No" determination), the processor 120 may perform operation 950.

In operation 935, whether a first input is selected may be determined based on a designated first input selection condition. In one embodiment, the processor 120 may determine, based on the designated first input selection condition, whether the first input among the first input and the second input in progress is selected. When it is determined, in operation 935, that the first input is selected ("Yes" determination), the processor 120 may perform operation 950. When it is determined, in operation 935, that the second input in progress is selected ("No" determination), the processor 120 may end the process according to FIG. 9.

In one embodiment, the first input selection condition may be that a touch signal is generated beyond a designated first distance condition range from the outer edge of the touch sensor panel 240. In one embodiment, the first input selection condition may be that a touch signal is generated in a region (the first region 211) other than the second region 212 of the touch sensor panel 240. In one embodiment, the first input selection condition may be that a proximity signal should not be generated within a predesignated first time condition range with reference to a touch signal generation time. In one embodiment, the first input selection condition may be that a proximity signal generation position must be outside a designated second distance condition range from a touch signal generation position. In one embodiment, the first input selection condition may be that the angle formed by a designated center position, the proximity signal generation position, and the touch signal generation position in the touch sensor panel 240 must be outside a first angle condition range. In one embodiment, the first input selection condition may be that a wheel input must not be identified. In one embodiment, the first input selection condition may be that a multi-wheel input must not be identified.

In operation 941, the processor 120 may determine whether the second input is identified. When the second input is determined to be identified in operation 941 ("Yes" determination), the processor 120 may perform operation 943. When the second input is determined not to be identified in operation 941 ("No" determination), the processor 120 may end the process according to FIG. 9.

In one embodiment, when a wheel input is identified based on a proximity identification input generated in the second region 212 of the touch sensor panel 240, the processor 120 may determine that the second input is identified.

In operation 943, the processor 120 may determine whether a first input in progress exists. When the first input in progress is determined to exist in operation 943 ("Yes" determination), the processor 120 may perform operation 945. When the first input in progress is determined not to exist in operation 943 ("No" determination), the processor 120 may perform operation 950.

In operation 945, the processor 120 may determine whether a second input is selected, based on a designated second input selection condition. In one embodiment, the processor 120 may determine, based on the designated second input selection condition, whether the second input among the first input in progress and the second input is selected. When it is determined, in operation 945, that the second input is selected ("Yes" determination), the processor 120 may perform operation 947. When it is determined, in operation 945, that the first input in progress is selected ("No" determination), the processor 120 may end the process according to FIG. 9.

In one embodiment, the second input selection condition may be that a touch signal is generated within the designated first distance condition range from the outer edge of the touch sensor panel 240. In one embodiment, the second input selection condition may be that a touch signal is generated in the second region 212 of the touch sensor panel 240. In one embodiment, the second input selection condition may be that a proximity signal should be generated within the predesignated first time condition range with reference to a touch signal generation time. In one embodiment, the second input selection condition may be that a proximity signal generation position must be within the designated second distance condition range from a touch signal generation position. In one embodiment, the second input selection condition may be that the angle formed by a designated center position, the proximity signal generation position, and the touch signal generation position in the touch sensor panel 240 must be within the first angle condition range. In one embodiment, the second input selection condition may be that a wheel input must be identified. In one embodiment, the second input selection condition may be that a multi-wheel input must be identified.

In operation 947, the processor 120 may cancel the first input in progress.

In operation 950, the processor 120 may perform a function according to a selected input.

In one embodiment, a selected first input may include a press, a long-press, a swipe, a drag, a flick, a pan, a tap, pinch-open, or pinch-close. In one embodiment, a selected second input may include a wheel input.

In one embodiment, a function according to the wheel input may be described with reference to FIGS. 12 to 17C.

Figure 10:
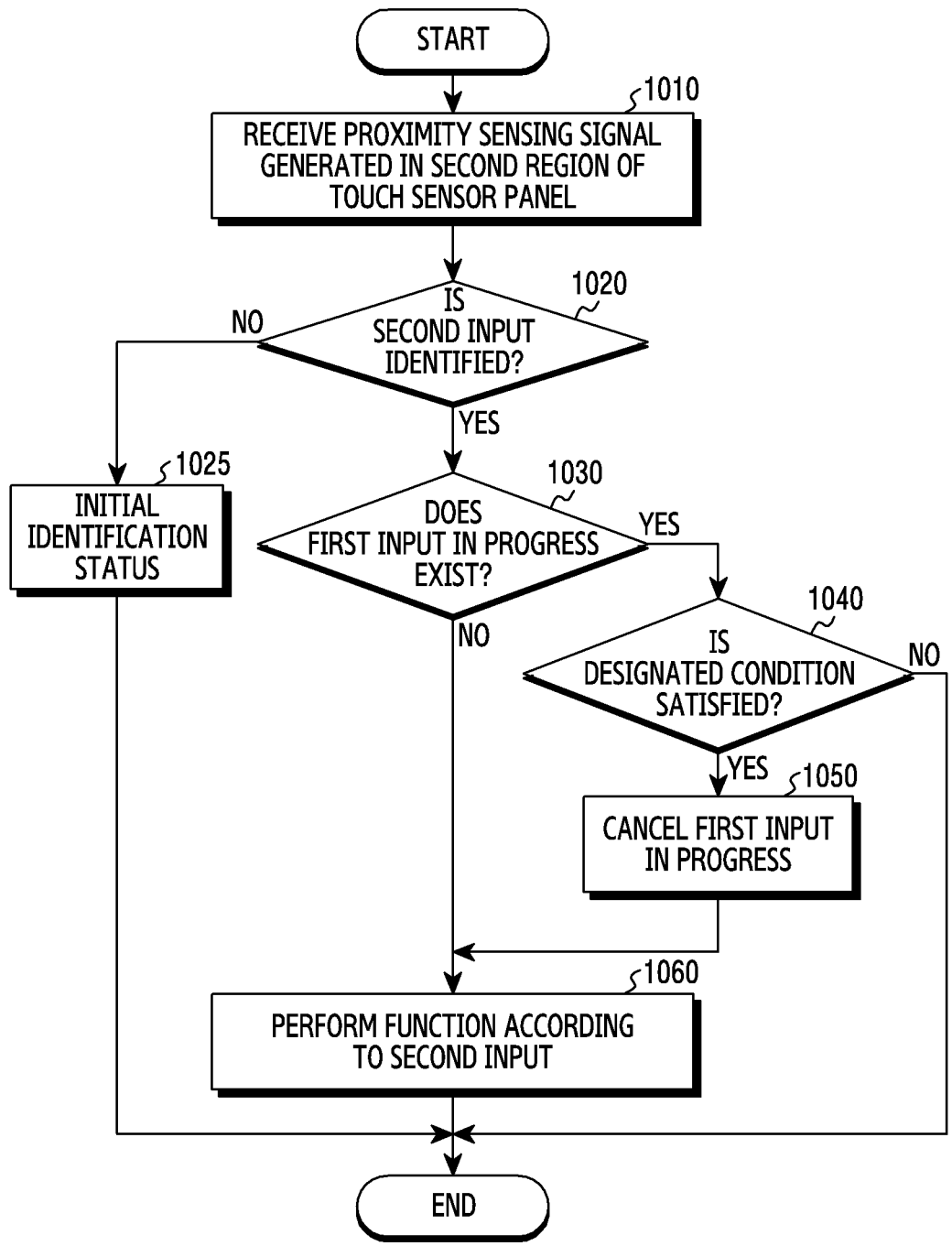
FIG. 10 is a flowchart illustrating processing being performed according to a proximity signal in an electronic device according to an embodiment of the disclosure.

FIG. 10 is a flowchart illustrating processing being performed according to a proximity signal in the electronic device 101 according to an embodiment of the disclosure.

Operations in FIG. 10 may be included operations in FIG. 9. FIG. 10 may be described with reference to the elements in FIGS. 1, 2A, and 2B.

Referring to FIG. 10, in operation 1010, the processor 120 of the electronic device 101 may receive a proximity signal generated in the second region 212 of the touch sensor panel 240.

In operation 1020, the processor 120 may determine whether a second input is identified. In operation 1020, the processor 120 may determine whether the second input is identified, based on a proximity signal. When the second input is determined to be identified in operation 1020 ("Yes" determination), the processor 120 may perform operation 1030. When the second input is determined not to be identified in operation 1020 ("No" determination), the processor 120 may perform operation 1025.

In one embodiment, when a wheel input is identified based on a proximity identification input generated in the second region 212 of the touch sensor panel 240, the processor 120 may determine that the second input is identified.

In operation 1025, the processor 120 may identify an initial status. In one embodiment, the processor 120 may identify a touch state of a bezel region as "initial", based on a proximity signal.

In operation 1030, the processor 120 may determine whether a first input in progress exists. When the first input in progress is determined to exist in operation 1030 ("Yes" determination), the processor 120 may perform operation 1040. When the first input in progress is determined not to exist in operation 1030 ("No" determination), the processor 120 may perform operation 1060

In operation 1040, the processor 120 may determine whether a designated second input selection condition is satisfied. When the designated second input selection condition is determined to be satisfied in operation 1040 ("Yes" determination), the processor 120 may perform operation 1050. When the designated second input selection condition is determined not to be satisfied in operation 1040 ("No" determination), the processor 120 may end the process.

In operation 1050, the processor 120 may cancel the first input in progress.

In operation 1060, the processor 120 may perform a function according to an input. In one embodiment, a function according to a wheel input may be described with reference to FIGS. 12 to 17C.

Figure 11:
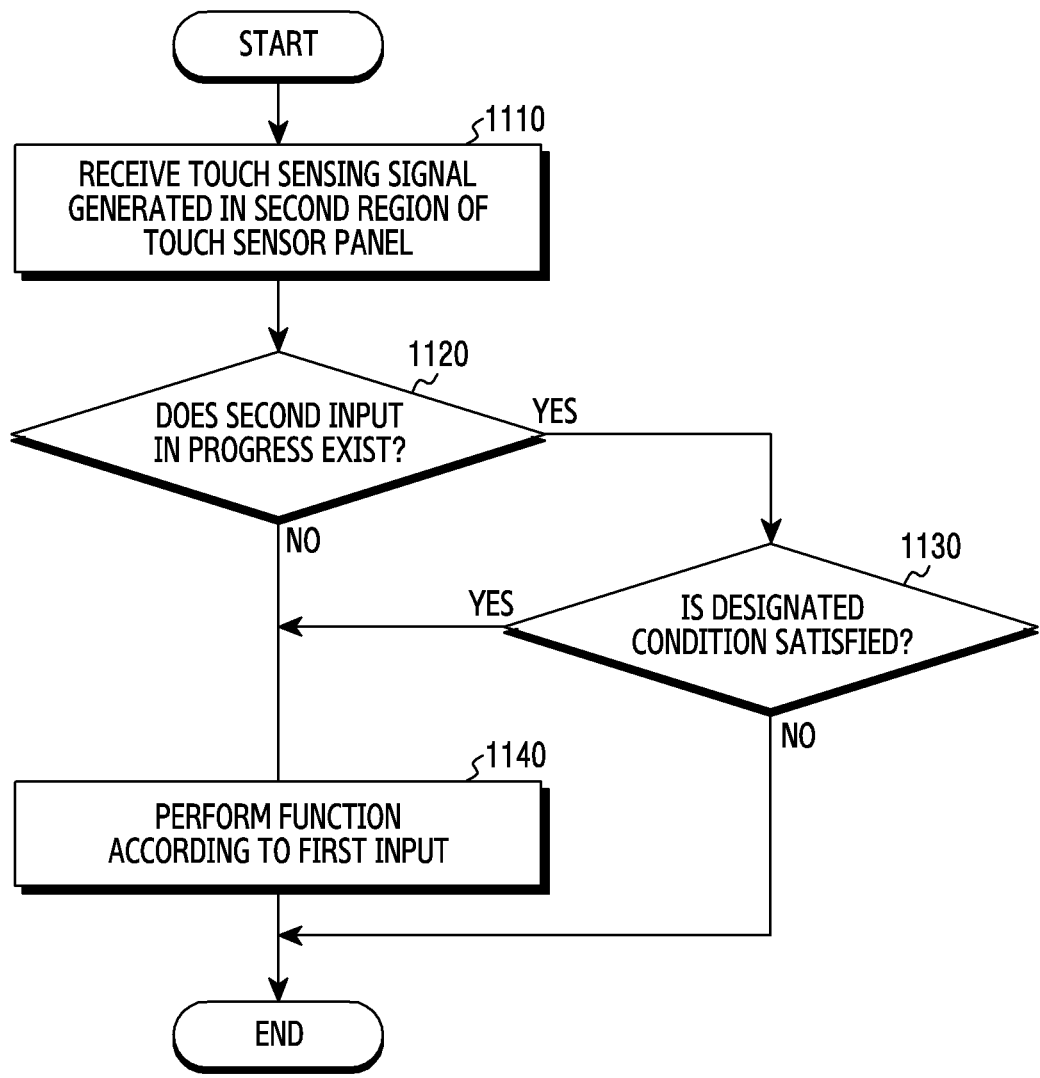
FIG. 11 is a flowchart illustrating processing being performed according to a touch signal in an electronic device according to an embodiment of the disclosure.

FIG. 11 is a flowchart illustrating processing being performed according to a touch signal in the electronic device 101 according to an embodiment of the disclosure.

Operations in FIG. 11 may be included in operations in FIG. 9. FIG. 11 may be described with reference to the elements in FIGS. 1, 2A, and 2B.

Referring to FIG. 11, in operation 1110, the processor 120 of the electronic device 101 may receive a touch signal generated in the second region 212 of the touch sensor panel 240.

In operation 1120, the processor 120 may determine whether a second input in progress exists. When the second input in progress is determined to exist in operation 1120 ("Yes" determination), the processor 120 may perform operation 1130. When the second input in progress is determined not to exist in operation 1120 ("No" determination), the processor 120 may perform operation 1140.

In operation 1130, the processor 120 may determine whether a first input selection condition is satisfied. When the first input selection condition is determined to be satisfied in operation 1130 ("Yes" determination), the processor 120 may perform operation 1140. When the first input selection condition is determined not to be satisfied in operation 1130 ("No" determination), the processor 120 may end the present process.

In operation 1140, the processor 120 may perform a function according to a first input. In one embodiment, the first input may include a press, a long-press, a swipe, a drag, a flick, a pan, a tap, pinch-open, or pinch-close.

Figure 12:
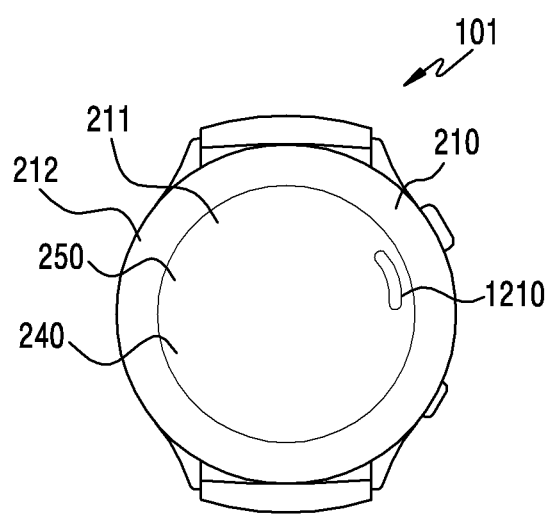
FIG. 12 illustrates an example of a function according to a wheel input in an electronic device according to an embodiment of the disclosure.

FIG. 12 illustrates an example of a function according to a wheel input in the electronic device 101 according to an embodiment of the disclosure.

Referring to FIG. 12, some of reference signs illustrated in FIGS. 2A and 2B may be omitted. However, the omission of some reference signs is made only for a description of FIG. 12, and does not signify that elements corresponding to the omitted reference signs do not exist. FIG. 12 may be described with reference to the elements in FIGS. 1, 2A, and 2B.

In one embodiment, a finger (not shown) of a user may come into contact with the second region 212 of the electronic device 101 to generate a proximity signal in the touch sensor panel 240. In one embodiment, the processor 120 may identify a wheel input, based on the proximity signal.

Referring to FIG. 12, when a wheel input is identified in the second region 212, the processor 120 may display, via the display 250, an identifier 1210 indicating that the wheel input has been applied. For example, when a wheel input is identified in the state in which the identifier 1210 is not displayed before the wheel input is identified, the processor 120 may display the identifier 1210 while the wheel input is maintained.

In one embodiment, when a wheel input is identified, the processor 120 may change display of the identifier 1210 so that the identifier 1210 indicates that the wheel input has been applied. For example, when a wheel is identified in the state in which the identifier 1210 is displayed according to a first configuration before the wheel input is identified, the processor 120 may display the identifier 1210 according to a second configuration while the wheel input is maintained. In one embodiment, the first configuration and the second configuration are different from each other in the color and size of the identifier 1210.

FIG. 13A illustrates a situation in which a multi-wheel input is applied to the electronic device 101 according to an embodiment of the disclosure.

FIG. 13B illustrates a situation in which a single-wheel input is applied to the electronic device 101 according to an embodiment of the disclosure.

Referring to FIGS. 13A and 13B, some of reference signs illustrated in FIGS. 2A and 2B may be omitted. However, the omission of some reference signs is made only for a description of FIGS. 13A and 13B, and does not signify that elements corresponding to the omitted reference signs do not exist. FIGS. 13A and 13B may be described with reference to the elements in FIGS. 1, 2A, and 2B.

Referring to FIGS. 13A and 13B, the electronic device 101 displays, via the display 250, a screen including: an indicator 1310 indicating the order of a current page among multiple pages; icons 1320 and 1321 included in the current page; and an indicator 1330 indicating a current selected icon among the icons 1320 and 1321. In one embodiment, the size of the icon 1320 indicated by the indicator 1330 may be larger than the size of the other icon 1321.

Referring to FIG. 13A, when a multi-wheel input is input in a predetermined rotation direction (e.g. in the clockwise direction) in the second region 212 of the electronic device 101, the position of the indicator 1330 may be changed according to the movement and rotation direction of the multi-wheel input. In one embodiment, the position of an indicator 1332 may be changed according to the movement and rotation direction of the multi-wheel input so that the indicator 1332 indicates another icon 1322.

Referring to FIG. 13B, when a single-wheel input is performed in a predetermined rotation direction (e.g. in the clockwise direction) in the second region 212 of the electronic device 101, the position of the indicator 1330 may be changed according to the movement and rotation direction of the single-wheel input. In one embodiment, the position of an indicator 1333 may be changed according to the movement and rotation direction of the single-wheel input so that the indicator 1333 indicates another icon 1323.

Referring to FIGS. 13A and 13B, even when the movement and rotation direction of the multi-wheel input is identical to the movement and rotation direction of the single-wheel input, the movement distance of the indicator 1332 according to the multi-wheel input may be longer than the movement distance of the indicator 1333 according to the single-wheel input. In one embodiment, the movement distance of a multi-wheel input for changing the position of the indicator 1310 may be shorter than the movement distance of a single-wheel input. In one embodiment, the movement angle of the multi-wheel input for changing the position of the indicator 1310 may be smaller than the movement angle of the single-wheel input.

In one embodiment, when a multi-wheel input is maintained in the state in which the movement of the multi-wheel stops for a predetermined time, the processor 120 may determine that an input for selection of the icon 1320 indicated by the indicator 1330 is applied while the multi-wheel input is maintained. In one embodiment, when a single-wheel input is maintained in the state in which the movement of the single-wheel stops for a predetermined time, the processor 120 may determine that an input for selection of the icon 1320 indicated by the indicator 1330 is applied while the single-wheel input is maintained.

Figure 14A:
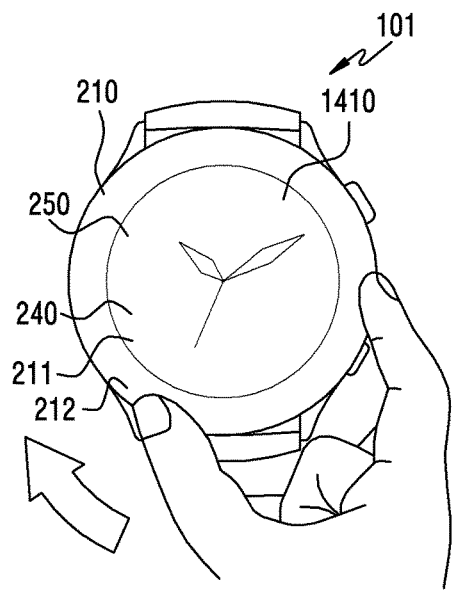
FIG. 14A illustrates a situation in which a multi-wheel input is applied to an electronic device according to an embodiment of the disclosure.

FIG. 14A illustrates a situation in which a multi-wheel input is applied to the electronic device 101 according to an embodiment of the disclosure.

Figure 14B:
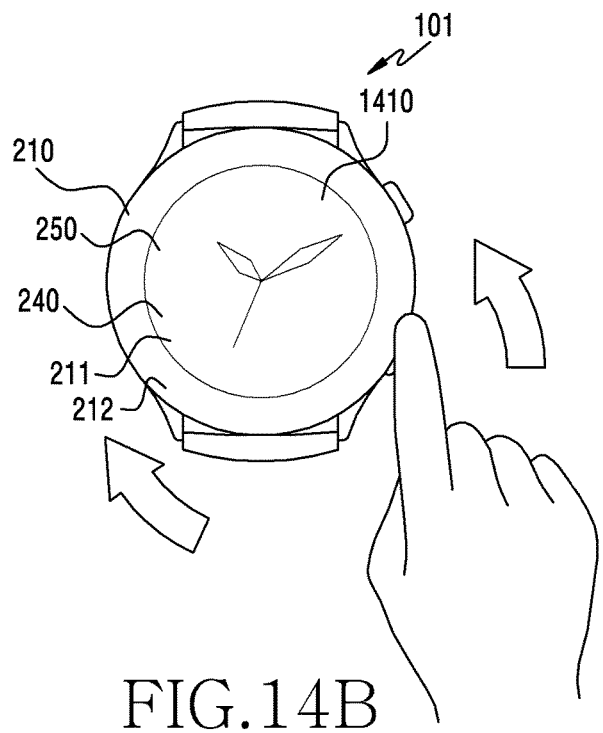
FIG. 14B illustrates a situation in which a single-wheel input is applied to an electronic device according to an embodiment of the disclosure.

FIG. 14B illustrates a situation in which a single-wheel input is applied to the electronic device 101 according to an embodiment of the disclosure.

Figure 14C:
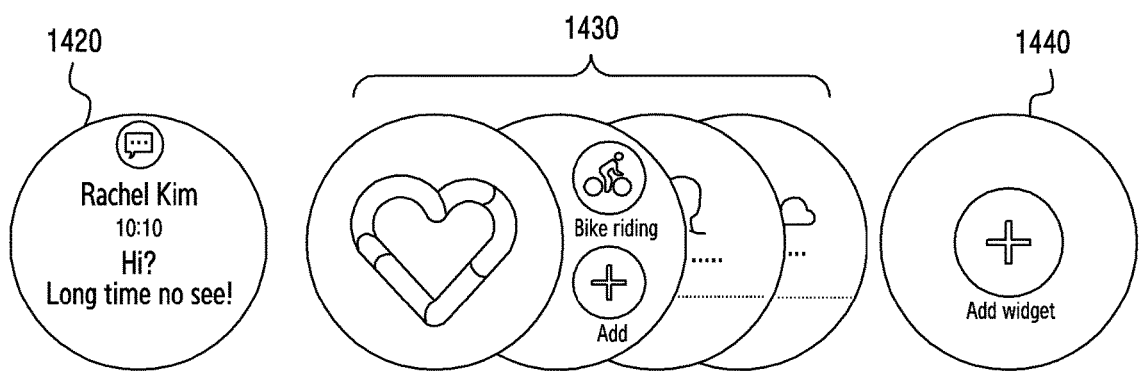
FIG. 14C illustrates screens changeable depending on a wheel input applied to an electronic device according to an embodiment of the disclosure.

FIG. 14C illustrates screens changeable depending on a wheel input applied to the electronic device 101 according to an embodiment of the disclosure.

Referring to FIGS. 14A, 14B, and 14C, some of reference signs illustrated in FIGS. 2A and 2B may be omitted. However, the omission of some reference signs is made only for a description of FIGS. 14A, 14B, and 14C, and does not signify that elements corresponding to the omitted reference signs do not exist. FIGS. 14A, 14B, and 14C may be described with reference to the elements in FIGS. 1, 2A, and 2B.

Referring to FIGS. 14A to 14C, the electronic device 101 may display a page 1410, which represents time, among multiple pages 1410 to 1440 via the display 250.

Referring to FIGS. 14A to 14C, when a single-wheel input or a multi-wheel input in the clockwise direction is input in the second region 212 of the electronic device 101, the processor 120 may display a page following the page 1410 (e.g. a page, positioned after the page 1410, among the pages 1430) via the display 250. Referring to FIGS. 14A to 14C, as the single-wheel input or the multi-wheel input in the clockwise direction is input in the second region 212 of the electronic device 101, the processor 120 may sequentially display pages following the page 1410 (e.g. the pages 1430 and a page position after a page 1440) via the display 250. Referring to FIGS. 14A to 14C, when a single-wheel input or a multi-wheel input in the counterclockwise direction is input in the second region 212 of the electronic device 101, the processor 120 may display a page prior to the page 1410 (e.g. a page 1420) via the display 250.

In one embodiment, the movement distance of the multi-wheel input for displaying the page following the page 1410 (e.g. a page, positioned after the page 1410, among the pages 1430) or the page prior to the page 1410 (e.g. the page 1420) may be shorter than the movement distance of the single-wheel input. In one embodiment, the movement angle of the multi-wheel input for displaying the page following the page 1410 (e.g. a page, positioned after the page 1410, among the pages 1430) may be smaller than the movement angle of the single-wheel input.

FIG. 15A illustrates a situation in which a multi-wheel input is applied to the electronic device 101 according to an embodiment of the disclosure.

FIG. 15B illustrates a situation in which a single-wheel input is applied to the electronic device 101 according to an embodiment of the disclosure.

FIG. 15C illustrates a situation in which a configuration value changes depending on a wheel input applied to the electronic device 101 according to an embodiment of the disclosure.

Referring to FIGS. 15A, 15B, and 15C, some of reference signs illustrated in FIGS. 2A and 2B may be omitted. However, the omission of some reference signs is made only for a description of FIGS. 15A, 15B, and 15C, and does not signify that elements corresponding to the omitted reference signs do not exist. FIGS. 15A, 15B, and 15C may be described with reference to the elements in FIGS. 1, 2A, and 2B.

Referring to FIGS. 15A to 15C, the electronic device 101 may display, via the display 250, a screen 1510 for controlling screen brightness. In one embodiment, the electronic device 101 may display, via the display 250, the screen 1510 including: an object 1511 indicating an item which is being currently controlled; and a configuration value 1515 of the item which is being currently adjusted.

Referring to FIGS. 15A to 15C, when a single-wheel input or a multi-wheel input in the counterclockwise direction is input in the second region 212 of the electronic device 101, the processor 120 may control, via the display 250, the configuration value 1515 of the item, which is being currently controlled, to be decreased. In one embodiment, on the basis of the single-wheel input or the multi-wheel input in the counterclockwise direction, the processor 120 may update a screen 1520 so as to indicate a decreased configuration value 1525 of the item which is being currently controlled.

Referring to FIGS. 15A to 15C, when a single-wheel input or a multi-wheel input in the clockwise direction is input in the second region 212 of the electronic device 101, the processor 120 may control, via the display 250, the configuration value 1515 of the item, which is being currently controlled, to be increased. In one embodiment, on the basis of the single-wheel input or the multi-wheel input in the clockwise direction, the processor 120 may update a screen 1530 so as to indicate an increased configuration value 1535 of the item which is being currently controlled.

In one embodiment, the movement distance of a multi-wheel for increasing or decreasing the configuration value of an item by a designated amount may be shorter than the movement distance of a single-wheel input. In one embodiment, the movement angle of the multi-wheel for increasing or decreasing the configuration value of an item by a designated amount may be smaller than the movement angle of the single-wheel input.

Figure 16A:
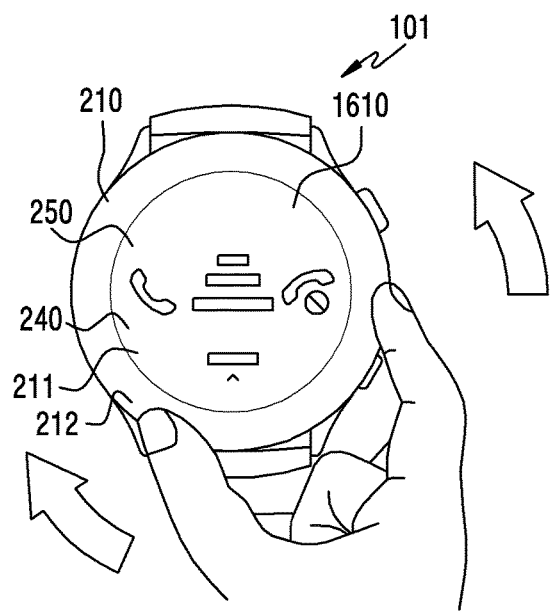
FIG. 16A illustrates a situation in which a multi-wheel input is applied to an electronic device according to an embodiment of the disclosure.

FIG. 16A illustrates a situation in which a multi-wheel input is applied to the electronic device 101 according to an embodiment of the disclosure.

Figure 16B:
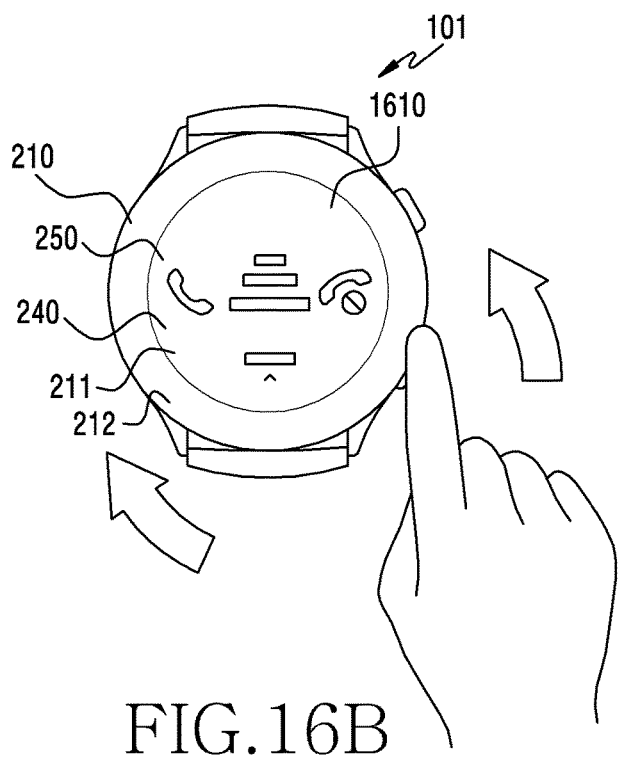
FIG. 16B illustrates a situation in which a single-wheel input is applied to an electronic device according to an embodiment of the disclosure.

FIG. 16B illustrates a situation in which a single-wheel input is applied to the electronic device 101 according to an embodiment of the disclosure.

Figure 16C:
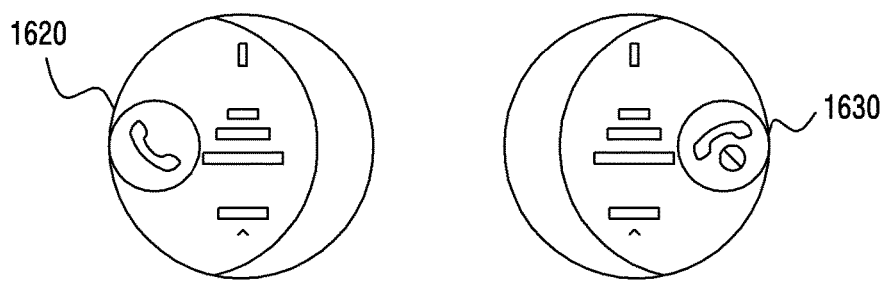
FIG. 16C illustrates a situation in which a call connection changes depending on a wheel input applied to an electronic device according to an embodiment of the disclosure.

FIG. 16C illustrates a situation in which a call connection changes depending on a wheel input applied to an electronic device according to an embodiment of the disclosure.

Referring to FIGS. 16A, 16B, and 16C, some of reference signs illustrated in FIGS. 2A and 2B may be omitted. However, the omission of some reference signs is made only for a description of FIGS. 16A, 16B, and 16C, and does not signify that elements corresponding to the omitted reference signs do not exist. FIGS. 16A, 16B, and 16C may be described with reference to the elements in FIGS. 1, 2A, and 2B.

Referring to FIGS. 16A and 16B, the electronic device 101 may display, via the display 250, a screen 1610 for indicating that a call connection request is being received.

Referring to FIGS. 16A to 16C, when a single-wheel input or a multi-wheel input in the counterclockwise direction is input in the second region 212 of the electronic device 101, the processor 120 may perform a call connection in response to the call connection request. In one embodiment, referring to FIGS. 16A to 16C, when the single-wheel input or the multi-wheel input in the counterclockwise direction is input in the second region 212 of the electronic device 101, the processor 120 may update a screen 1620 in order to indicate acceptance of the call connection request.

Referring to FIGS. 16A to 16C, when a single-wheel input or a multi-wheel input in the clockwise direction is input in the second region 212 of the electronic device 101, the processor 120 may not perform a call connection in response to the call connection request. Referring to FIGS. 16A to 16C, when the single-wheel input or the multi-wheel input in the clockwise direction is input in the second region 212 of the electronic device 101, the processor 120 may update a screen 1630 in order to indicate refusal of the call connection request.

In one embodiment, the movement distance of a multi-wheel input for the acceptance or refusal of the call connection request may be shorter than the movement distance of a single-wheel input. In one embodiment, the movement angle of the multi-wheel input for the acceptance or refusal of the call connection request may smaller than the movement angle of the single-wheel input.

FIG. 17A illustrates a situation in which a multi-wheel input is applied to the electronic device according to an embodiment of the disclosure.

FIG. 17B illustrates a situation in which a single-wheel input is applied to the electronic device 101 according to an embodiment of the disclosure.

FIG. 17C illustrates a situation in which a user interface changes depending on a wheel input applied to the electronic device 101 according to an embodiment of the disclosure.

Referring to FIGS. 17A, 17B, and 17C, some of reference signs illustrated in FIGS. 2A and 2B may be omitted. However, the omission of some reference signs is made only for a description of FIGS. 17A, 17B, and 17C, and does not signify that elements corresponding to the omitted reference signs do not exist. FIGS. 17A, 17B, and 17C may be described with reference to the elements in FIGS. 1, 2A, and 2B.

Referring to FIGS. 17A and 17B, the electronic device 101 may display, via the display 250, a screen 1710 for indicating a virtual keyboard for typing.

Referring to FIGS. 17A to 17C, when a single-wheel input or a multi-wheel input in the clockwise or counterclockwise direction is input in the second region 212 of the electronic device 101, the processor 120 may update a screen 1720 so that characters included in the virtual keyboard are changed.

In one embodiment, the movement distance of a multi-wheel input for changing the characters included in the virtual keyboard may be shorter than the movement distance of a single-wheel input. In one embodiment, the movement angle of the multi-wheel input for changing the characters included in the virtual keyboard may be smaller than the movement angle of the single-wheel input.

Figure 18:
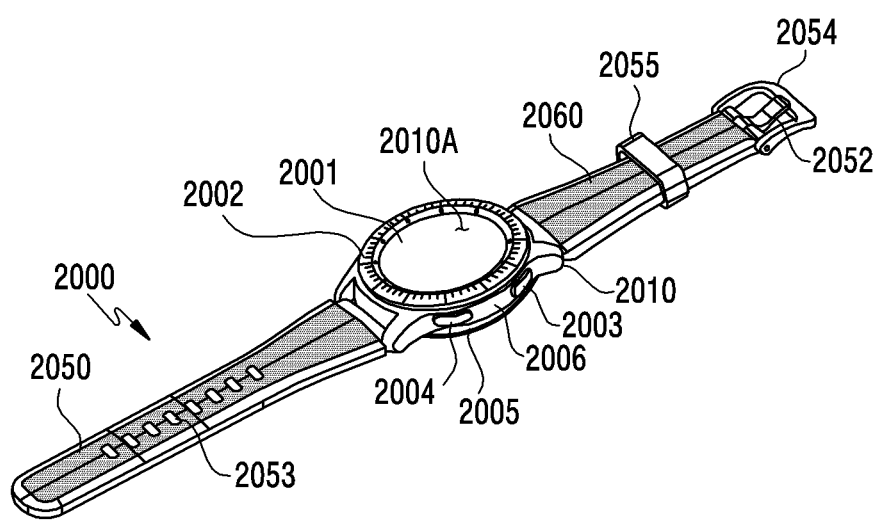
FIG. 18 is a perspective view of the front surface of an electronic device according to an embodiment of the disclosure.

FIG. 18 is a perspective view of the front surface of an electronic device 2000 according to an embodiment of the disclosure.

Figure 19:
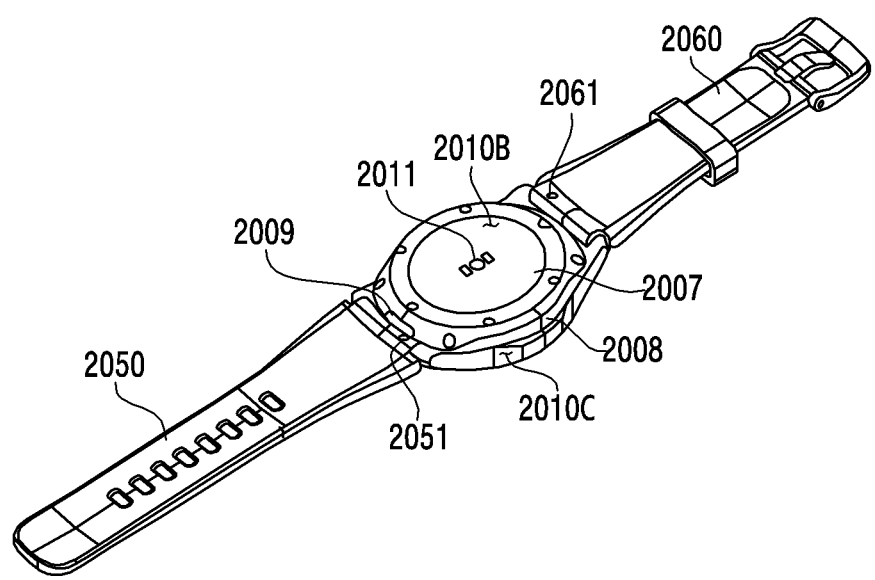
FIG. 19 is a perspective view of the rear surface of the electronic device in FIG. 18 according to an embodiment of the disclosure.

FIG. 19 is a perspective view of the rear surface of the electronic device 2000 in FIG. 18 according to an embodiment of the disclosure.

Figure 20:
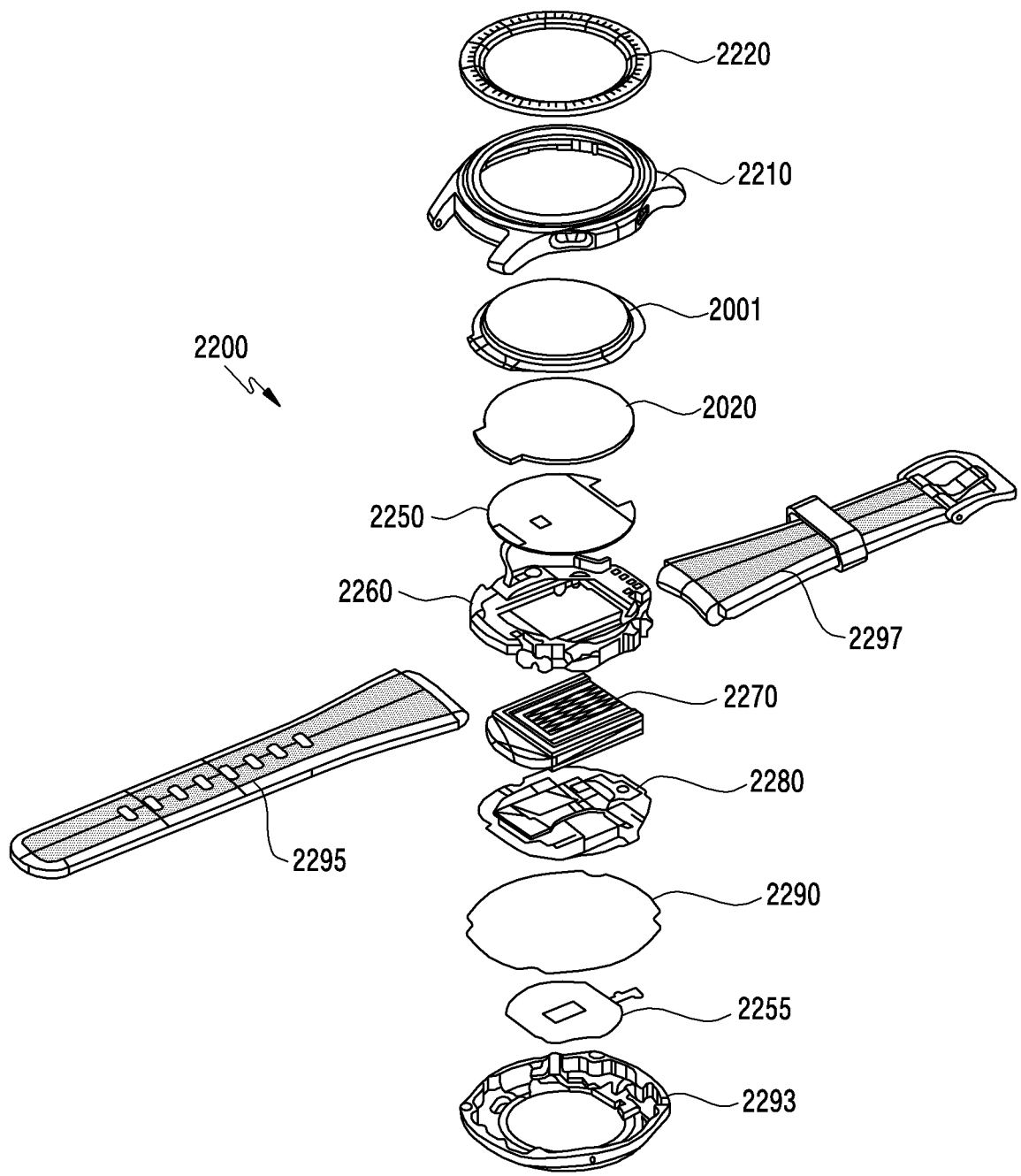
FIG. 20 is an exploded perspective view of the electronic device in FIG. 18 according to an embodiment of the disclosure.

FIG. 20 is an exploded perspective view of the electronic device 2000 in FIG. 18 according to an embodiment of the disclosure.

The electronic device 2000 in FIGS. 18 to 20 may correspond to the electronic device 101 described with reference to FIGS. 1 to 17C.

Referring to FIGS. 18 and 19, the electronic device 2000 according to one embodiment may include: a housing 2010, which includes a first surface (or the front surface) 2010A, a second surface (or the rear surface) 2010B, and a side surface 2010C surrounding the space between the first surface 2010A and the second surface 2010B; and fastening members 2050 and 2060, each of which is connected to at least a part of the housing 2010 and is configured to detachably bind the electronic device 2000 to a part (e.g. the wrist, the ankle, etc.) of the user body. In another embodiment (not shown), the housing may refer to a structure of forming some of the first surface 2010A, the second surface 2010B, and the side surface 2010C in FIG. 18. According to one embodiment, at least a part of the first surface 2010A may be formed of a substantially transparent front plate 2001 (e.g. a polymer plate or a glass plate including various coating layers). The second surface 2010B may be formed of a substantially opaque rear plate 2007. The rear plate 2007 may be formed of, for example, coated or colored glass, ceramic, polymer, metal (e.g. aluminum, stainless steel (STS), or magnesium), or a combination of at least two among the materials. The side surface 2010C may be coupled to the front plate 2001 and the rear plate 2007, and may be formed of a side bezel structure (or a "side member") 2006 containing metal and/or polymer. In an embodiment, the rear plate 2007 and the side bezel structure 2006 may be formed integrally with each other, and may include the same material (e.g. a metal material such as aluminum). The fastening members 2050 and 2060 may be formed of various materials and in various shapes. Integrated or multiple unit links may be movably formed of a woven material, leather, rubber, urethane, metal, ceramic, or a combination of at least two among the materials.

According to one embodiment, the electronic device 2000 may include at least one among: a display 2020 (see FIG. 20); audio modules 2005 and 2008; a sensor module 2011, key input devices 2002, 2003, and 2004; and a connector hole 2009. In an embodiment, at least one (e.g. the key input devices 2002, 2003, and 2004, the connector hole 2009, or the sensor module 2011) of the elements may be omitted in the electronic device 2000, or another element may be additionally included in the electronic device 2000.

The display 2020 may be exposed through a considerable part of the front plate 2001. The display 2020 may have a shape corresponding to the shape of the front plate 2001, and may be formed in various shapes, such as a circular shape, an elliptical shape, or a polygonal shape. The display 2020 may be coupled to or disposed adjacent to a touch sensing circuit, a pressure sensor capable of measuring the strength (pressure) of touch, and/or a fingerprint sensor.

The audio modules 2005 and 2008 may include a microphone hole 2005 and a speaker hole 2008. A microphone for obtaining external sound may be disposed in the microphone hole 2005. In an embodiment, multiple microphones may be arranged in the microphone hole 2005 so as to sense the direction of sound. The speaker hole 2008 may be used as an external speaker and a call receiver. In an embodiment, speaker holes 2007 and 2014 and a microphone hole 2003 may be implemented as one hole, or a speaker may be included without the speaker holes 2007 and 2014 (e.g. a piezo speaker).

The sensor module 2011 may generate an electrical signal or data value corresponding to an operation state inside the electronic device 2000 or an external environmental state. The sensor module 2011 may include a biometric sensor module 2011 (e.g. an HRM sensor) disposed on the second surface 2010B of the housing 2010. The electronic device 2000 may further include at least one among unillustrated sensor modules, such as a gesture sensor, a gyro sensor, a barometer sensor, a magnetic sensor, an acceleration sensor, a grip sensor, a color sensor, an infrared (IR) sensor, a biometric sensor, a temperature sensor, a humidity sensor, or an illumination sensor.

The key input devices 2002, 2003, and 2004 may include: a wheel key 2002 disposed on the first surface 2010A of the housing 2010 and rotatable in at least one direction; and side key buttons 2003 and 2004 disposed on the side surface 2010C of the housing 2010. The wheel key may have a shape corresponding to the shape of the front plate 2001. In another embodiment, the electronic device 2000 may not include some or all of the key input devices 2002, 2003, and 2004 described above. The key input devices 2002, 2003, and 2004, which are not included in the electronic device 2000, may be implemented in other forms such as a soft key on the display 2020. The connector hole 2009 may include different connector holes (not shown), which are capable of receiving a connector (e.g. a universal serial bus (USB) connector) for transmitting or receiving power and/or data to or from an external electronic device, and a connector for transmitting or receiving an audio signal to or from the external electronic device. The electronic device 2000 may include, for example, a connector cover (not shown) for covering at least a part of the connector hole 2009 so as to block inflow of external foreign substances into the connector hole.

The fastening members 2050 and 2060 may be detachably fastened to at least a partial region of the housing 2010 by using locking members 2051 and 2061. The fastening members 2050 and 2060 may include one or more among a fixing member 2052, a fixing-member fastening hole 2053, a band guide member 2054, a band fixing ring 2055.

The fixing member 2052 may be configured to fix the housing 2010 and the fastening members 2050 and 2060 to a part (e.g. the wrist, the ankle, etc.) of the user body. The fixing member fastening hole 2053 may fix the housing 2010 and the fastening members 2050 and 2060 to the part of the user body while corresponding to the fixing member 2052. The band guide member 2054 may be configured to limit the movement range of the fixing member 2052 when the fixing member 2052 is fastened to the fixing member fastening hole 2053, and may enable the fastening members 2050 and 2060 to be in close contact with and attached to the part of user body. The band fixing ring 2055 may limit the movement range of the fastening members 2050 and 2060 while the fixing member 2052 is fastened to the fixing member fastening hole 2053.

Referring to FIG. 20, an electronic device 2200 may include: a side bezel structure 2210; a wheel key 2220; a front plate 2001, a display 2020; a first antenna 2250; a second antenna 2255; a support member 2260 (e.g. a bracket); a battery 2270; a printed circuit board 2280; a sealing member 2290; a rear plate 2293; and fastening members 2295 and 2297. At least one of the elements of the electronic device 2200 may be the same as or similar to at least one of the elements of the electronic device 2000 in FIG. 18 or 19, and thus a redundant description thereof will be omitted hereinafter. The support member 2260 may be disposed inside the electronic device 2200 and connected to the side bezel structure 2210, or may be formed integrally with the side bezel structure 2210. The support member 2260 may be formed of, for example, a metal material and/or a nonmetal (e.g. polymer) material. The display 2020 may be coupled to one surface of the support member 2260, and the printed circuit board 2280 may be coupled to another surface of the support member 2260. A processor, a memory, and/or an interface may be mounted on the printed circuit board 2280. The processor may include one or more among, for example, a central processing unit (CPU), an application processor, a graphics processing unit (GPU), sensor processor, or a communication processor.

The memory may include, for example, volatile memory or non-volatile memory. The interface may include, for example, a high definition multimedia interface (HDMI), a universal serial bus (USB) interface, a secure digital (SD) card interface, and/or an audio interface. For example, the interface may electrically or physically connect the electronic device 2200 to an external electronic device, and may include a USB connector, an SD card/multimedia card (MMC) connector, or an audio connector.

The battery 2270 is a device for supplying power to at least one element of the electronic device 2200, and may include a non-rechargeable primary battery, a rechargeable secondary battery, or a fuel cell. At least a part of the battery 2270 may be substantially disposed on the same plane with the printed circuit board 2280. The battery 2270 may be integrally disposed in the electronic device 2200, and may be detachably disposed on the electronic device 2200.

The first antenna 2250 may be disposed between the display 2020 and the support member 2260. The first antenna 2250 may include, for example, a near-field communication (NFC) antenna, a wireless charging antenna, and/or a magnetic secure transmission (MST) antenna. For example, the first antenna 2250 may perform near-field communication with an external device, or may transmit or receive power necessary for charging to or from the external device in a wireless manner. Further, the first antenna 2250 may transmit a near-field communication signal or a magnetic-based signal including payment data. In another embodiment, an antenna structure may be formed of the side bezel structure 2210 and/or a part of the support member 2260 or a combination thereof.

The second antenna 2255 may be disposed between the printed circuit board 2280 and the rear plate 2293. The second antenna 2255 may include, for example, a near-field communication (NFC) antenna, a wireless charging antenna, and/or a magnetic secure transmission (MST) antenna. For example, the second antenna 2255 may perform near-field communication with an external device, or may transmit or receive power necessary for charging to or from the external device in a wireless manner. Further, the second antenna 2255 may transmit a near-field communication signal or a magnetic-based signal including payment data. In another embodiment, an antenna structure may be formed of the side bezel structure 2210 and/or a part of the rear plate 2293 or a combination thereof.

The sealing member 2290 may be disposed between the side bezel structure 2210 and the rear plate 2293. The sealing member 2290 may be configured to block moisture and foreign substances externally introduced into the space surrounded by the side bezel structure 2210 and the rear plate 2293.

Figure 21:
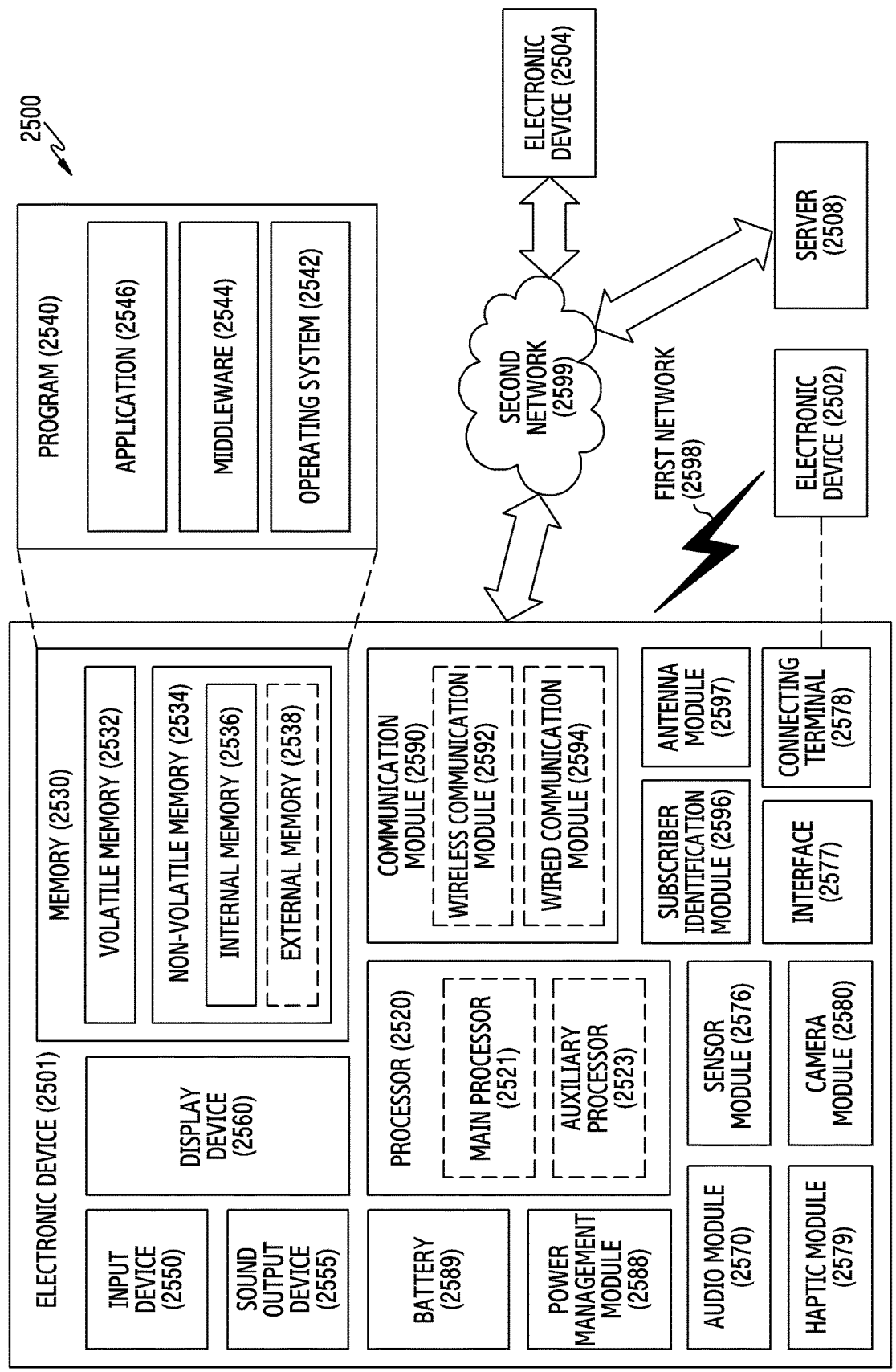
FIG. 21 is a block diagram of an electronic device in a network environment according to an embodiment of the disclosure.

FIG. 21 is a block diagram illustrating an electronic device 2501 in a network environment 2500 according to an embodiment of the disclosure.

Referring to FIG. 21, the electronic device 2501 in the network environment 2500 may communicate with an electronic device 2502 via a first network 2598 (e.g., a short-range wireless communication network), or an electronic device 2504 or a server 2508 via a second network 2599 (e.g., a long-range wireless communication network). According to an embodiment, the electronic device 2501 may communicate with the electronic device 2504 via the server 2508. According to an embodiment, the electronic device 2501 may include a processor 2520, memory 2530, an input device 2550, a sound output device 2555, a display device 2560, an audio module 2570, a sensor module 2576, an interface 2577, a haptic module 2579, a camera module 2580, a power management module 2588, a battery 2589, a communication module 2590, a subscriber identification module (SIM) 2596, or an antenna module 2597. In some embodiments, at least one (e.g., the display device 2560 or the camera module 2580) of the components may be omitted from the electronic device 2501, or one or more other components may be added in the electronic device 2501. In some embodiments, some of the components may be implemented as single integrated circuitry. For example, the sensor module 2576 (e.g., a fingerprint sensor, an iris sensor, or an illuminance sensor) may be implemented as embedded in the display device 2560 (e.g., a display).

The processor 2520 may execute, for example, software (e.g., a program 2540) to control at least one other component (e.g., a hardware or software component) of the electronic device 2501 coupled with the processor 2520, and may perform various data processing or computation. According to one embodiment, as at least part of the data processing or computation, the processor 2520 may load a command or data received from another component (e.g., the sensor module 2576 or the communication module 2590) in volatile memory 2532, process the command or the data stored in the volatile memory 2532, and store resulting data in non-volatile memory 2534. According to an embodiment, the processor 2520 may include a main processor 2521 (e.g., a central processing unit (CPU) or an application processor (AP)), and an auxiliary processor 2523 (e.g., a graphics processing unit (GPU), an image signal processor (ISP), a sensor hub processor, or a communication processor (CP)) that is operable independently from, or in conjunction with, the main processor 2521. Additionally or alternatively, the auxiliary processor 2523 may be adapted to consume less power than the main processor 2521, or to be specific to a specified function. The auxiliary processor 2523 may be implemented as separate from, or as part of the main processor 2521.

The auxiliary processor 2523 may control at least some of functions or states related to at least one component (e.g., the display device 2560, the sensor module 2576, or the communication module 2590) among the components of the electronic device 2501, instead of the main processor 2521 while the main processor 2521 is in an inactive (e.g., sleep) state, or together with the main processor 2521 while the main processor 2521 is in an active state (e.g., executing an application). According to an embodiment, the auxiliary processor 2523 (e.g., an image signal processor or a communication processor) may be implemented as part of another component (e.g., the camera module 2580 or the communication module 2590) functionally related to the auxiliary processor 2523.

The memory 2530 may store various data used by at least one component (e.g., the processor 2520 or the sensor module 2576) of the electronic device 2501. The various data may include, for example, software (e.g., the program 2540) and input data or output data for a command related thereto. The memory 2530 may include the volatile memory 2532 or the non-volatile memory 2534.

The program 2540 may be stored in the memory 2530 as software, and may include, for example, an operating system (OS) 2542, middleware 2544, or an application 2546.

The input device 2550 may receive a command or data to be used by other component (e.g., the processor 2520) of the electronic device 2501, from the outside (e.g., a user) of the electronic device 2501. The input device 2550 may include, for example, a microphone, a mouse, a keyboard, or a digital pen (e.g., a stylus pen).

The sound output device 2555 may output sound signals to the outside of the electronic device 2501. The sound output device 2555 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 2560 may visually provide information to the outside (e.g., a user) of the electronic device 2501. The display device 2560 may include, for example, a display, a hologram device, or a projector and control circuitry to control a corresponding one of the display, hologram device, and projector. According to an embodiment, the display device 2560 may include touch circuitry adapted to detect a touch, or sensor circuitry (e.g., a pressure sensor) adapted to measure the intensity of force incurred by the touch.

The audio module 2570 may convert a sound into an electrical signal and vice versa. According to an embodiment, the audio module 2570 may obtain the sound via the input device 2550, or output the sound via the sound output device 2555 or a headphone of an external electronic device (e.g., an electronic device 2502) directly (e.g., wiredly) or wirelessly coupled with the electronic device 2501.

The sensor module 2576 may detect an operational state (e.g., power or temperature) of the electronic device 2501 or an environmental state (e.g., a state of a user) external to the electronic device 2501, and then generate an electrical signal or data value corresponding to the detected state. According to an embodiment, the sensor module 2576 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 2577 may support one or more specified protocols to be used for the electronic device 2501 to be coupled with the external electronic device (e.g., the electronic device 2502) directly (e.g., wiredly) or wirelessly. According to an embodiment, the interface 2577 may include, for example, a high definition multimedia interface (HDMI), a universal serial bus (USB) interface, a secure digital (SD) card interface, or an audio interface.

A connecting terminal 2578 may include a connector via which the electronic device 2501 may be physically connected with the external electronic device (e.g., the electronic device 2502). According to an embodiment, the connecting terminal 2578 may include, for example, a HDMI connector, a USB connector, a SD card connector, or an audio connector (e.g., a headphone connector).

The haptic module 2579 may convert an electrical signal into a mechanical stimulus (e.g., a vibration or a movement) or electrical stimulus which may be recognized by a user via his tactile sensation or kinesthetic sensation. According to an embodiment, the haptic module 2579 may include, for example, a motor, a piezoelectric element, or an electric stimulator.

The camera module 2580 may capture a still image or moving images. According to an embodiment, the camera module 2580 may include one or more lenses, image sensors, image signal processors, or flashes.

The power management module 2588 may manage power supplied to the electronic device 2501. According to one embodiment, the power management module 2588 may be implemented as at least part of, for example, a power management integrated circuit (PMIC).

The battery 2589 may supply power to at least one component of the electronic device 2501. According to an embodiment, the battery 2589 may include, for example, a primary cell which is not rechargeable, a secondary cell which is rechargeable, or a fuel cell.

The communication module 2590 may support establishing a direct (e.g., wired) communication channel or a wireless communication channel between the electronic device 2501 and the external electronic device (e.g., the electronic device 2502, the electronic device 2504, or the server 2508) and performing communication via the established communication channel. The communication module 2590 may include one or more communication processors that are operable independently from the processor 2520 (e.g., the application processor (AP)) and supports a direct (e.g., wired) communication or a wireless communication. According to an embodiment, the communication module 2590 may include a wireless communication module 2592 (e.g., a cellular communication module, a short-range wireless communication module, or a global navigation satellite system (GNSS) communication module) or a wired communication module 2594 (e.g., a local area network (LAN) communication module or a power line communication (PLC) module). A corresponding one of these communication modules may communicate with the external electronic device via the first network 2598 (e.g., a short-range communication network, such as Bluetooth™, wireless-fidelity (Wi-Fi) direct, or infrared data association (IrDA)) or the second network 2599 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 2592 may identify and authenticate the electronic device 2501 in a communication network, such as the first network 2598 or the second network 2599, using subscriber information (e.g., international mobile subscriber identity (IMSI)) stored in the subscriber identification module 2596.

The antenna module 2597 may transmit or receive a signal or power to or from the outside (e.g., the external electronic device) of the electronic device 2501. According to an embodiment, the antenna module 2597 may include an antenna including a radiating element composed of a conductive material or a conductive pattern formed in or on a substrate (e.g., printed circuit board (PCB)). According to an embodiment, the antenna module 2597 may include a plurality of antennas. In such a case, at least one antenna appropriate for a communication scheme used in the communication network, such as the first network 2598 or the second network 2599, may be selected, for example, by the communication module 2590 (e.g., the wireless communication module 2592) from the plurality of antennas. The signal or the power may then be transmitted or received between the communication module 2590 and the external electronic device via the selected at least one antenna. According to an embodiment, another component (e.g., a radio frequency integrated circuit (RFIC)) other than the radiating element may be additionally formed as part of the antenna module 2597.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 2501 and the external electronic device 2504 via the server 2508 coupled with the second network 2599. Each of the electronic devices 2502 and 2504 may be a device of a same type as, or a different type, from the electronic device 2501. According to an embodiment, all or some of operations to be executed at the electronic device 2501 may be executed at one or more of the external electronic devices 2502, 2504, or 2508. For example, if the electronic device 2501 should perform a function or a service automatically, or in response to a request from a user or another device, the electronic device 2501, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 2501.

The electronic device 2501 may provide the outcome, with or without further processing of the outcome, as at least part of a reply to the request. To that end, a cloud computing, distributed computing, or client-server computing technology may be used, for example.

Figure 22:
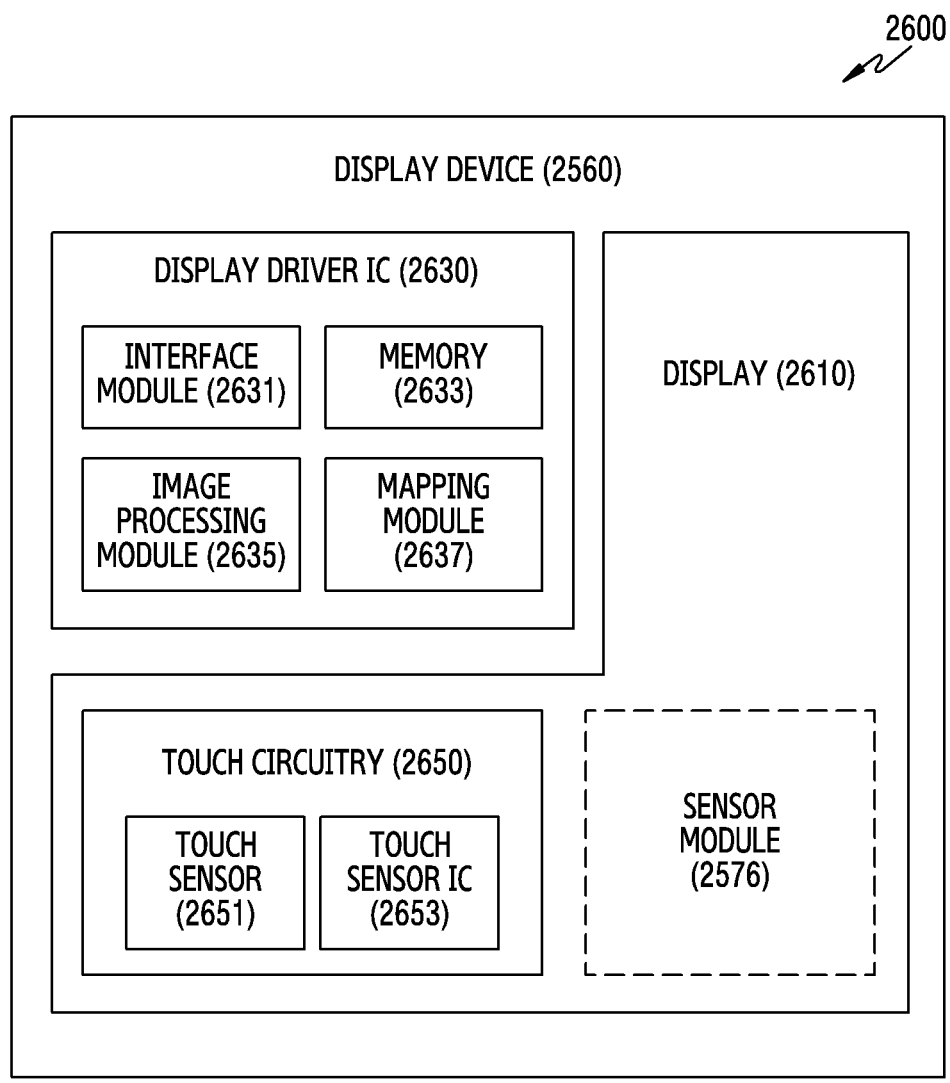
FIG. 22 is a block diagram of a display device according to an embodiment of the disclosure.

FIG. 22 is a block diagram 2600 illustrating the display device 2560 according to an embodiment of the disclosure.

Referring to FIG. 22, the display device 2560 may include a display 2610 and a display driver integrated circuit (DDI) 2630 to control the display 2610. The DDI 2630 may include an interface module 2631, memory 2633 (e.g., buffer memory), an image processing module 2635, or a mapping module 2637. The DDI 2630 may receive image information that contains image data or an image control signal corresponding to a command to control the image data from another component of the electronic device 2501 via the interface module 2631. For example, according to an embodiment, the image information may be received from the processor 2520 (e.g., the main processor 2521 (e.g., an application processor)) or the auxiliary processor 2523 (e.g., a graphics processing unit) operated independently from the function of the main processor 2521. The DDI 2630 may communicate, for example, with touch circuitry 2550 or the sensor module 2576 via the interface module 2631. The DDI 2630 may also store at least part of the received image information in the memory 2633, for example, on a frame by frame basis.

The image processing module 2635 may perform pre-processing or post-processing (e.g., adjustment of resolution, brightness, or size) with respect to at least part of the image data. According to an embodiment, the pre-processing or post-processing may be performed, for example, based at least in part on one or more characteristics of the image data or one or more characteristics of the display 2610.

The mapping module 2637 may generate a voltage value or a current value corresponding to the image data pre-processed or post-processed by the image processing module 2635. According to an embodiment, the generating of the voltage value or current value may be performed, for example, based at least in part on one or more attributes of the pixels (e.g., an array, such as a red, green, and blue (RGB) stripe or a pentile structure, of the pixels, or the size of each subpixel). At least some pixels of the display 2610 may be driven, for example, based at least in part on the voltage value or the current value such that visual information (e.g., a text, an image, or an icon) corresponding to the image data may be displayed via the display 2610.

According to an embodiment, the display device 2560 may further include the touch circuitry 2650. The touch circuitry 2650 may include a touch sensor 2651 and a touch sensor integrated circuit (IC) 2653 to control the touch sensor 2651. The touch sensor IC 2653 may control the touch sensor 2651 to sense a touch input or a hovering input with respect to a certain position on the display 2610. To achieve this, for example, the touch sensor 2651 may detect (e.g., measure) a change in a signal (e.g., a voltage, a quantity of light, a resistance, or a quantity of one or more electric charges) corresponding to the certain position on the display 2610. The touch circuitry 2650 may provide input information (e.g., a position, an area, a pressure, or a time) indicative of the touch input or the hovering input detected via the touch sensor 2651 to the processor 2520. According to an embodiment, at least part (e.g., the touch sensor IC 2653) of the touch circuitry 2650 may be formed as part of the display 2610 or the DDI 2630, or as part of another component (e.g., the auxiliary processor 2523) disposed outside the display device 2560.

According to an embodiment, the display device 2560 may further include at least one sensor (e.g., a fingerprint sensor, an iris sensor, a pressure sensor, or an illuminance sensor) of the sensor module 2576 or a control circuit for the at least one sensor. In such a case, the at least one sensor or the control circuit for the at least one sensor may be embedded in one portion of a component (e.g., the display 2610, the DDI 2630, or the touch circuitry 2550)) of the display device 2560. For example, when the sensor module 2576 embedded in the display device 2560 includes a biometric sensor (e.g., a fingerprint sensor), the biometric sensor may obtain biometric information (e.g., a fingerprint image) corresponding to a touch input received via a portion of the display 2610. As another example, when the sensor module 2576 embedded in the display device 2560 includes a pressure sensor, the pressure sensor may obtain pressure information corresponding to a touch input received via a partial or whole area of the display 2610. According to an embodiment, the touch sensor 2651 or the sensor module 2576 may be disposed between pixels in a pixel layer of the display 2610, or over or under the pixel layer.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 2540) including one or more instructions that are stored in a storage medium (e.g., internal memory 2536 or external memory 2538) that is readable by a machine (e.g., the electronic device 2501). For example, a processor (e.g., the processor 2520) of the machine (e.g., the electronic device 2501) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

As described above, an electronic device and an operation method thereof according to one embodiment may select and process, based on a designated condition, one of a touch input and a wheel input when the touch input and the wheel input simultaneously occur. As described above, an electronic device and an operation method thereof according to one embodiment may select and process, based on a designated condition, one of a touch input and a wheel input, thereby providing the processing result conforming to a user's intention.

An electronic device according to one embodiment includes: a cover window; a display disposed under the cover window; a touch panel, which includes multiple touch sensing elements disposed in a region corresponding to the display and is configured to generate at least one of a touch signal or a proximity signal by using the multiple touch sensing elements; a processor operationally connected to the display and the touch panel; and a memory operationally connected to the processor, wherein the memory may store instructions which, when executed by the processor, cause the processor to: identify a first touch input in a first region on the cover window, corresponding to the display, by using the touch signal generated by the touch sensor; identify a first proximity input in a second region on the cover window, surrounding the display, by using the proximity signal generated by the touch sensor; determine whether a designated input determination condition is satisfied, based on the first touch input and the first proximity input; select one of the touch input in the first region corresponding to the display or the first proximity input in the second region surrounding the display, based on whether the designated input determination condition has been satisfied; and perform a function corresponding to the selected input.

In one embodiment, when the instructions are executed by the processor, the instructions may cause the processor to ignore the first touch input until the first proximity input ends when the first proximity input is selected from among the first touch input or the first proximity input.

In one embodiment, when the instructions are executed by the processor, the instructions may cause the processor to select the first proximity input from among the first touch input or the first proximity input when a first input position of the first touch input is within a designated first distance from a at least partial region of the cover window.

In one embodiment, when the instructions are executed by the processor, the instructions may cause the processor to select the first proximity input from among the first touch input or the first proximity input when an input time of the first proximity input is within a designated first time based on an input time of the first touch input.

In one embodiment, when the instructions are executed by the processor, the instructions may cause the processor to select the first proximity input from among the first touch input or the first proximity input when a second input position of the first proximity input is within a designated second distance from a first input position of the first touch input.

In one embodiment, when the instructions are executed by the processor, the instructions may cause the processor to, when the first proximity input is selected, perform a function corresponding to the selected first proximity input by displaying an indicator, indicating that the first proximity input has been identified, on the display.

In one embodiment, when the instructions are executed by the processor, the instructions may cause the processor to: identify, while the first proximity input is maintained, a second proximity input in at least a partial region of the cover window surrounding the display by using another proximity signal generated by the touch sensor; and select the first proximity input from among the first touch input or the first proximity input when the second proximity input is identified while the first proximity input is maintained.

In one embodiment, when the instructions are executed by the processor, the instructions may cause the processor to perform the function corresponding to the selected input by configuring a degree of adjustment of a user interface by a reference movement distance of the first proximity input and the second proximity input while the first proximity input and the second proximity input are simultaneously identified, to be higher than a degree of adjustment of the user interface by a reference movement distance of the first proximity input while the first proximity input is identified.

In one embodiment, when the instructions are executed by the processor, the instructions may cause the processor to perform the function corresponding to the selected first proximity input by: reducing a size of an object being displayed via the display when the second input position of the first proximity input becomes closer to a third input position of the second proximity input; and increasing the size of the object when the second input position becomes more distant from the third input position.

In one embodiment, when the instructions are executed by the processor, the instructions may cause the processor to, when the first proximity input is selected, perform the function corresponding to the selected first proximity input by replacing a page being displayed via the display with another page as a second input position of the first proximity input is changed.

An operation method of a wearable electronic device according to one embodiment may include: identifying a first touch input in a first region, corresponding to a display of the wearable electronic device, on a cover window of the wearable electronic device, by using a touch signal generated by a touch sensor of the wearable electronic device; identifying a first proximity input in a second region on the cover window, surrounding the display, by using a proximity signal generated by the touch sensor; determining whether a designated input determination condition is satisfied, based on the first touch input and the first proximity input; selecting one of the touch input in the first region corresponding to the display or the first proximity input in the second region surrounding the display, based on whether the designated input determination condition has been satisfied; and performing a function corresponding to the selected input.

In one embodiment, the operation method may further include ignoring the first touch input until the first proximity input ends when the first proximity input is selected from among the first touch input or the first proximity input.

In one embodiment, the selecting of the one input may further include selecting the first proximity input from among the first touch input or the first proximity input when a first input position of the first touch input is within a designated first distance from a at least partial region of the cover window.

In one embodiment, the selecting of the one input may further include selecting the first proximity input from among the first touch input or the first proximity input when an input time of the first proximity input is within a designated first time based on an input time of the first touch input.

In one embodiment, the selecting of the one input may further include selecting the first proximity input from among the first touch input or the first proximity input when a second input position of the first proximity input is within a designated second distance from a first input position of the first touch input.

In one embodiment, the performing of the function corresponding to the selected input may further include performing, when the first proximity input has been selected, a function corresponding to the selected first proximity input by displaying an indicator, indicating that the first proximity input has been identified, on the display.

In one embodiment, the operation method may further include identifying, while the first proximity input is maintained, a second proximity input in at least a partial region of the cover window surrounding the display by using another proximity signal generated by the touch sensor, wherein the selecting of the one input may further include selecting the first proximity input from among the first touch input or the first proximity input when a second proximity input is identified while the first proximity input is maintained.

In one embodiment, the performing of the function corresponding to the selected input may further include performing the function corresponding to the selected input by configuring a degree of adjustment of a user interface by a reference movement distance of the first proximity input and the second proximity input while the first proximity input and the second proximity input are simultaneously identified, to be higher than a degree of adjustment of the user interface by a reference movement distance of the first proximity input while the first proximity input is identified.

In one embodiment, the performing of the function corresponding to the selected input may further include performing a function corresponding to the selected first proximity input by: reducing a size of an object being displayed via the display when the second input position of the first proximity input becomes closer to a third input position of the second proximity input; and increasing the size of the object when the second input position becomes more distant from the third input position.

In one embodiment, the performing of the function corresponding to the selected input may further include performing, when the first proximity input is selected, a function corresponding to the selected first proximity input by replacing a page being displayed via the display with another page as a second input position of the first proximity input is changed.

In one embodiment, the operation method may further include establishing a direct communication channel or a wireless communication channel between the wearable electronic device and an external electronic device.

In one embodiment, a communication circuit of the wearable electronic device supports communication via the established direct communication channel or the established wireless communication channel.

In one embodiment, the communication circuit of the wearable electronic device comprises at least one of a wireless communication module, a global navigation satellite system, or a wired communication module.

Methods according to an embodiment of the disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The one or more program may include instructions that cause the electronic device to perform the methods according to an embodiment of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Any combination of some or all of them may form a memory in which the program is stored. Further, a plurality of such memories may be included in the electronic device.

In addition, the programs may be stored in an attachable storage device which is accessible through communication networks such as the Internet, Intranet, local area network (LAN), wide area network (WAN), and storage area network (SAN), or a combination thereof. Such a storage device may access the electronic device via an external port. Further, a separate storage device on the communication network may access a portable electronic device.

In the above-described example embodiments of the disclosure, a component included in the disclosure is expressed in the singular or the plural according to a presented example embodiment. However, the singular form or plural form is selected for convenience of description suitable for the presented situation, and an embodiment of the disclosure are not limited to a single element or multiple elements thereof. Further, either multiple elements expressed in the description may be configured into a single element or a single element in the description may be configured into multiple elements.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A wearable electronic device comprising:
   a display;
   a cover window covering at least the display, the cover window comprising a first region corresponding to the display and a second region surrounding the display;
   a touch panel including one or more touch sensing elements;
   at least one processor operationally connected to the display and the touch panel; and
   a memory operationally connected to the at least one processor, the memory storing instructions which, when executed by the at least one processor, cause the at least one processor to:
      receive a first touch input and a first proximity input, the first touch input and the first proximity input being received as a first user input,
      based on a touch signal being generated by the one or more touch sensing elements, identify, from the first user input, the first touch input applied to the first region on the cover window,
      based on a proximity signal being generated by the one or more touch sensing elements, identify, from the first user input, the first proximity input applied to the second region on the cover window,
      in response to identifying the receiving of the first touch input and the first proximity input, determine whether a designated input determination condition is satisfied based on information associated with the first touch input and information associated with the first proximity input,
      based on a result of the determining of whether the designated input determination condition is satisfied, determine one of the first touch input or the first proximity input, and
      perform a function corresponding to the determined one of the first touch input or the first proximity input as a function of the first user input, and ignore another input not being determined.

2. The wearable electronic device of claim 1, wherein the instructions, when executed by the at least one processor, further cause the at least one processor to:
   ignore the first touch input until the first proximity input ends based on the first proximity input being determined from among the first touch input or the first proximity input.

3. The wearable electronic device of claim 1, wherein the instructions, when executed by the at least one processor, further cause the at least one processor to:
   determine the first proximity input from among the first touch input or the first proximity input based on an input position of the first touch input being within a designated distance from at least a partial region of the cover window.

4. The wearable electronic device of claim 1, wherein the instructions, when executed by the at least one processor, further cause the at least one processor to:
   determine the first proximity input from among the first touch input or the first proximity input based on an input time of the first proximity input being within a designated time of an input time of the first touch input.

5. The wearable electronic device of claim 1, wherein the instructions, when executed by the at least one processor, further cause the at least one processor to:
   determine the first proximity input from among the first touch input or the first proximity input based on an input position of the first proximity input being within a designated distance from an input position of the first touch input.

6. The wearable electronic device of claim 1, wherein the instructions, when executed by the at least one processor, further cause the at least one processor to:
   based on the first proximity input being determined from among the first touch input or the first proximity input, perform the function corresponding to the first proximity input as the function of the first user input by displaying, on the display, an indicator indicating that the first proximity input has been identified.

7. The wearable electronic device of claim 1, wherein the instructions, when executed by the at least one processor, further cause the at least one processor to:
   while the first proximity input is maintained, receive a second user input, the second user input comprising a second proximity input,
   identify, from the second user input, the second proximity input in the second region of the cover window, by using another proximity signal generated by the one or more touch sensing elements, and
   based on the second proximity input being identified while the first proximity input is maintained, determine the first proximity input from among the first touch input or the first proximity input.

8. The wearable electronic device of claim 7, wherein the instructions, when executed by the at least one processor, further cause the at least one processor to:
   perform the function corresponding to the first proximity input as the function of the first user input, by configuring a degree of adjustment of a user interface by a reference movement distance of the first proximity input and the second proximity input, while the first proximity input and the second proximity input are simultaneously identified, to be higher than a degree of adjustment of the user interface by a reference movement distance of the first proximity input while the first proximity input is identified.

9. The wearable electronic device of claim 7, wherein the instructions, when executed by the at least one processor, further cause the at least one processor to perform the function corresponding to the first proximity input as the function of the first user input by:
reducing a size of an object being displayed via the display based on an input position of the first proximity input becoming closer to an input position of the second proximity input, and
increasing the size of the object based on the input position of the first proximity input becoming further from the input position of the second proximity input.

10. The wearable electronic device of claim 1, wherein the instructions, when executed by the at least one processor, further cause the at least one processor to:
based on the first proximity input being determined, perform the function corresponding to the determined first proximity input as the function of the first user input, by replacing a page being displayed via the display with another page as an input position of the first proximity input is changed.

11. A method of operating a wearable electronic device, the method comprising:
receiving a first touch input and a first proximity input, the first touch input and the first proximity input being received as a first user input;
identifying, from the first user input, the first touch input applied to a first region on a cover window of a display of the wearable electronic device, the first region corresponding to the display, the first touch input being identified by using a touch signal generated by a touch sensor of the wearable electronic device;
identifying, from the first user input, the first proximity input applied to a second region on the cover window, the second region surrounding the display, the first proximity input being identified by using a proximity signal generated by the touch sensor;
in response to identifying the first touch input and the first proximity input being received, determining whether a designated input determination condition is satisfied based on information associated with the first touch input and information associated with the first proximity input;
based on a result of the determining of whether the designated input determination condition is satisfied, determining one of the first touch input or the first proximity input; and
performing a function corresponding to the determined one of the first touch input or the first proximity input as a function of the first user input, and ignoring another input not being determined.

12. The method of claim 11, further comprising:
ignoring the first touch input until the first proximity input ends based on the first proximity input being determined from among the first touch input or the first proximity input.

13. The method of claim 11, wherein the determining of the one of the first touch input or the first proximity input comprises:
determining the first proximity input from among the first touch input or the first proximity input based on an input position of the first touch input being within a designated distance from at least a partial region of the cover window.

14. The method of claim 11, wherein the determining of the one of the first touch input or the first proximity input comprises:
determining the first proximity input from among the first touch input or the first proximity input based on an input time of the first proximity input being within a designated time of an input time of the first touch input.

15. The method of claim 11, wherein the determining of the one of the first touch input or the first proximity input comprises:
determining the first proximity input from among the first touch input or the first proximity input based on an input position of the first proximity input being within a designated distance from an input position of the first touch input.

16. The method of claim 11, wherein the performing of the function comprises:
based on the first proximity input being determined from among the first touch input or the first proximity input, perform the function corresponding to the first proximity input as the function of the first user input by displaying, on the display, an indicator indicating that the first proximity input has been identified.

17. The method of claim 11, further comprising:
while the first proximity input is maintained, receiving a second user input, the second user input comprising a second proximity input; and
identifying, from the second user input, the second proximity input in at least a partial region of the cover window, the partial region of the of the cover window surrounding the display, the second proximity input being identified by using another proximity signal generated by the touch sensor,
wherein the determining of the one of the first touch input or the first proximity input comprises determining the first proximity input from among the first touch input or the first proximity input based on the second proximity input being identified while the first proximity input is maintained.

18. The method of claim 17, wherein the performing of the function comprises:
performing the function corresponding to the first proximity input as the function of the first user input, by configuring a degree of adjustment of a user interface by a reference movement distance of the first proximity input and the second proximity input while the first proximity input and the second proximity input are simultaneously identified, to be higher than a degree of adjustment of the user interface by a reference movement distance of the first proximity input while the first proximity input is identified.

19. The method of claim 17, wherein the performing of the function comprises performing the function corresponding to the first proximity input as the function of the first user input by:
reducing a size of an object being displayed via the display based on an input position of the first proximity input becoming closer to an input position of the second proximity input; and
increasing the size of the object based on the input position of the first proximity input becoming further from the input position of the second proximity input.

20. The method of claim 11, wherein the performing of the function comprises:
based on the first proximity input being determined from among the first touch input or the first proximity input, performing the function corresponding to the first proximity input as the function of the first user input, by replacing a page being displayed via the display with another page as an input position of the first proximity input is changed.

21. The wearable electronic device of claim 1, wherein the first touch input and the first proximity input are simultaneously generated.

\* \* \* \* \*